(12) United States Patent
Takahashi et al.

(10) Patent No.: US 12,177,480 B2
(45) Date of Patent: Dec. 24, 2024

(54) IMAGE PROCESSING APPARATUS AND METHOD

(71) Applicant: Sony Group Corporation, Tokyo (JP)

(72) Inventors: Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 239 days.

(21) Appl. No.: 17/782,175

(22) PCT Filed: Dec. 11, 2020

(86) PCT No.: PCT/JP2020/046249
§ 371 (c)(1),
(2) Date: Jun. 3, 2022

(87) PCT Pub. No.: WO2021/117859
PCT Pub. Date: Jun. 17, 2021

(65) Prior Publication Data
US 2023/0043987 A1 Feb. 9, 2023

Related U.S. Application Data

(60) Provisional application No. 62/947,910, filed on Dec. 13, 2019.

(51) Int. Cl.
*H04N 19/00* (2014.01)
*H04N 19/597* (2014.01)
*H04N 21/2389* (2011.01)

(52) U.S. Cl.
CPC ....... *H04N 19/597* (2014.11); *H04N 21/2389* (2013.01)

(58) Field of Classification Search
CPC .......................... H04N 19/597; H04N 21/2389
See application file for complete search history.

(56) References Cited

U.S. PATENT DOCUMENTS

2018/0376180 A1 12/2018 Ramalingam
2019/0303392 A1 10/2019 Eade
(Continued)

FOREIGN PATENT DOCUMENTS

CN 104137551 A 11/2014
CN 108810571 A 11/2018
(Continued)

OTHER PUBLICATIONS

Ahmed Hamza et al: "Evaluation Result for CE on Partial Access of PC Data", 128. MPEG Meeting; Oct. 7, 2019-Oct. 11, 2019; Geneva; (Motion Picture Expert Group or ISO/IEC JTC1/SC29/WG11), No. m50051 Sep. 20, 2019 (Sep. 20, 2019), XP030205950.
(Continued)

*Primary Examiner* — Zhihan Zhou
(74) *Attorney, Agent, or Firm* — XSENSUS LLP

(57) ABSTRACT

The present disclosure relates to an image processing apparatus and method that enable linking between a 3D spatial region and an atlas tile group. Link information is generated and signaled, in which the link information is stored in a file together with a bitstream of a point cloud expressing an object having a three-dimensional shape as a set of points, and the link information links a 3D spatial region of the point cloud with an atlas tile group. On the basis of the link information, the 3D spatial region and the atlas tile group that correspond to a desired three-dimensional space are selected. The present disclosure can be applied to, for example, an image processing apparatus, an information processing apparatus, an image processing method, an information processing method, or the like.

20 Claims, 32 Drawing Sheets

(56) References Cited

U.S. PATENT DOCUMENTS

| | | | |
|---|---|---|---|
| 2019/0318488 A1 | 10/2019 | Lim et al. | |
| 2021/0176496 A1* | 6/2021 | Chupeau | G06T 7/529 |
| 2021/0227232 A1 | 7/2021 | Oh | |
| 2022/0329923 A1* | 10/2022 | Hamza | H04N 21/816 |

FOREIGN PATENT DOCUMENTS

| | | | |
|---|---|---|---|
| CN | 109313657 A | 2/2019 | |
| CN | 110198451 A | 9/2019 | |
| EP | 3540696 A1 | 9/2019 | |
| JP | 2018-198421 A | 12/2018 | |
| WO | 2019/094184 A1 | 5/2019 | |
| WO | 2019/142834 A1 | 7/2019 | |
| WO | WO-2021141208 A1 | 7/2021 | |
| WO | WO-2021211665 A1 | 10/2021 | |

OTHER PUBLICATIONS

Lukasz Kondrad et al: (33. 2) [PCC Systems] Atlases with multiple tile groups as separate tracks in ISOBMFF, 130. MPEG Meeting; Apr. 20, 2020-Apr. 24, 2020; Alpbach; (Motion Picture Expert Group or ISO/IEC JTC1/SC29/WG11), No. m53120 Apr. 15, 2020 (Apr. 15, 2020), XP030286044.

Ryohei Takahashi et al: "[PCC-Systems] On V-PCC partial access", 129. MPEG Meeting; Jan. 13, 2020-Jan. 17, 2020; Brussels; (Motion Picture Expert Group or ISO/IEC JTC1/SC29/WG11), No. m52240 Jan. 8, 2020 (Jan. 8, 2020), XP030224832.

Sejin Oh (Lge) : "(33.1) [PCC System] the support of partial access of V-PCC data", 130. MPEG Meeting; Apr. 20, 2020-Apr. 24, 2020; Alpbach; (Motion Picture Expert Group or ISO/IEC JTC1/SC29/WG11), No. m53469 Apr. 15, 2020 (Apr. 15, 2020), XP030287010.

International Search Report and Written Opinion mailed on Mar. 9, 2021, received for PCT Application PCT/JP2020/046249, Filed on Dec. 11, 2020, 8 pages including English Translation.

"Information technology—Coding of audio-visual objects—Part 12:ISO base media file format", International Standard, ISO/IEC 14496-12, Fifth Edition, Feb. 20, 2015, 284 pages.

"Information technology—Coding of audio-visual objects—Part 15: Carriage of network abstraction layer (NAL) unit structured video in the ISO base media file format", ISO/IEC FDIS 14496-15:2014(E), ISO/IEC JTC 1/SC 29/WG 11, Jan. 13, 2014, pp. 1-170.

"Revised Text of ISO/IEC CD 23090-10 Carriage of Video-based Point Cloud Coding Data", ISO/IEC JTC 1/SC 29/WG 11 N18606, Nov. 8, 2019, pp. 1-41.

"Text of ISO/IEC DIS 23090-5 Video-based Point Cloud Compression", ISO/IEC JTC 1/SC 29/WG 11 N18670, Oct. 10, 2019, pp. 1-175.

* cited by examiner

FIG. 7

```
aligned(8) class SpatialRegionGroupBox extends TrackGroupTypeBox('3drg') {
}
```

```
aligned(8) class VPCCSpatialRegionsBox extends FullBox('vpsr',0,0) {
    unsigned int(16) num_regions;
    for (i = 0; i < num_regions; i++) {
        3DSpatialRegionStruct(1);
        unsigned int(8) num_track_groups;
        for (j=0; j<num_track_groups; j++) {
            unsigned int(32) track_group_id;
        }
    }
}
```

FIG. 10

| | | |
|---|---|---|
| 1 | | spatial region track group IS LINKED WITH atlas tile group IN multi track structure |
| | 1-1 | tile_group_id IS LINKED TO track_group_id |
| | 1-2 | groupID IS ASSIGNED TO LINK |
| | 1-3 | video sub-bitstream IS SUBJECTED TO HEVC tile ENCODING, AND HEVC tile IS LINKED WITH atlas tile group |
| 2 | | spatial region track group IS LINKED WITH atlas tile group IN single track structure |
| | 2-1 | groupID IS ASSIGNED TO LINK |
| | 2-2 | V-PCC bitstream(track) IS DIVIDED FOR EVERY 3D spatial region |
| 3 | | SWITCHING DISPLAY OF ALTERNATIVE 3D spatial region AT SAME POSITION IN THREE-DIMENSIONAL SPACE IS ENABLED |
| 4 | | Matroska Media Container IS APPLIED |

FIG. 12

```
aligned(8) class VPCCSpatialRegionsBox extends FullBox('vpsr',0,0) {
    unsigned int(16) num_regions;
    for (i = 0; i < num_regions; i++) {
        3DSpatialRegionStruct(1);
        unsigned int(8) num_track_groups;
        for (j=0; j<num_track_groups; j++) {
            unsigned int(8) num_tile_groups;
            for (k=0; k<num_tile_groups; k++)
                unsigned int(16) tile_group_id;  // atgh_adress
            unsigned int(32) track_group_id;
        }
    }
}
```

FIG. 14

```
aligned(8) class SpatialRegionGroupBox extends
TrackGroupTypeBox('3drg') {
    unsigned int(16) offset_x;
    unsigned int(16) offset_y;
    unsigned int(16) width;
    unsigned int(16) height;
    unsigned int(16) total_width;
    unsigned int(16) total_height;
}
```

FIG. 18

```
aligned(8) class VPCCSpatialRegionsBox extends FullBox('vpsr',0,0) {
    unsigned int(16) num_regions;
    for (i = 0; i < num_regions; i++) {
        3DSpatialRegionStruct(i);
        unsigned int(8) num_track_groups;  // num_track_groups=1
        for (j=0; j<num_track_groups; j++) {
            unsigned int(8) num_tile_groups;
            for (k=0; k<num_tile_groups; k++)
                unsigned int(16) tile_group_id;  // groupID in nalm of V-PCC track
            unsigned int(32) track_group_id;
        }
    }
}
```

FIG. 19

```
aligned(8) class VPCCSpatialRegionsBox extends FullBox('vpsr',0,0) {
    unsigned int(16) num_regions;
    for (i = 0; i < num_regions; i++) {
        3DSpatialRegionStruct(1);
        unsigned int(8) num_track_groups;
        if(num_track_groups==0) {
            unsigned int(8) num_tile_groups;
            for (k=0; k<num_tile_groups; k++)
                unsigned int(16) tile_group_id; // groupID in nalm of V-PCC track
        }
        for (j=0; j<num_track_groups; j++) {
            unsigned int(8) num_tile_groups;
            for (k=0; k<num_tile_groups; k++)
                unsigned int(16) tile_group_id; // groupID in nalm of V-PCC track
            unsigned int(32) track_group_id;
        }
    }
}
```

FIG. 23

```
aligned(8) class VPCCSpatialRegionsBox extends FullBox('vpsr',0,flags) {
    unsigned int(16) num_regions;
    for (i = 0; i < num_regions; i++) {
        3DSpatialRegionStruct(1);
        if(flags & 1) {
            unsigned int(8) num_tile_groups;
            for (k=0; k<num_tile_groups; k++)
                unsigned int(16) tile_group_id; // groupID in nalm
        } else {
            unsigned int(8) num_track_groups;
            for (j=0; j<num_track_groups; j++) {
                unsigned int(8) num_tile_groups;
                for (k=0; k<num_tile_groups; k++)
                    unsigned int(16) tile_group_id; // groupID in nalm
                unsigned int(32) track_group_id;
            }
        }
    }
}
```

FIG. 25

```
aligned(8) class VPCCSpatialRegionsBox extends FullBox('vpsr',0,0) {
    unsigned int(16) num_regions;
    for (i = 0; i < num_regions; i++) {
        3DSpatialRegionStruct(1);
        unsigned int(8) num_track_groups;
        for (j=0; j<num_track_groups; j++) {
            unsigned int(8) num_tile_groups;
            for (k=0; k<num_tile_groups; k++)
                unsigned int(16) tile_group_id;
            unsigned int(32) track_group_id;
        }
    }
    unsigned int(16) num_region_lists;
    for (i = 0; i < num_region_lists; i++)
        AlternativeRegionListStruct();
}
```

```
aligned(8) class AlternativeRegionListStruct() {
    unsigned int(16) list_id;
    unsigned int(16) list_type;
    unsigned int(16) num_alternative_regions;
    for (i = 0; i < num_alternative_regions; i++) {
        unsigned int(16) ref_3d_region_id;
        unsigned int(16) region_type_value;
    }
}
```

FIG. 26

```
aligned(8) class AlternativeRegionListStruct() {
    unsigned int(16) num_alternative_regions;
    for (i = 0; i < num_alternative_regions; i++) {
        unsigned int(16) ref_3d_region_id;
        unsigned int(16) event_id;
    }
}
```

IMAGE PROCESSING APPARATUS AND METHOD

CROSS-REFERENCE TO RELATED APPLICATIONS

The present application is based on PCT filing PCT/JP2020/046249, filed Dec. 11, 2020, which claims priority to U.S. Provisional Application No. 62/947,910 filed Dec. 13, 2019, the entire contents of each are incorporated herein by reference.

TECHNICAL FIELD

The present disclosure relates to an image processing apparatus and method, and more particularly, to an image processing apparatus and method capable of linking a 3D spatial region and an atlas tile group with each other.

BACKGROUND ART

Conventionally, encoding and decoding of point cloud data expressing an object having a three-dimensional shape as a set of points has been standardized by a moving picture experts group (MPEG). Then, there has been proposed a method of projecting geometry data and attribute data of the point cloud onto a two-dimensional plane for each small region, arranging an image (a patch) projected onto the two-dimensional plane in a frame image of a video, and encoding the frame image by an encoding method for a two-dimensional image (hereinafter, also referred to as video based point cloud compression (V-PCC)) (see, for example, Non Patent Document 1).

Furthermore, there is international organization for standardization base media file format (ISOBMFF), which is a file container specification of an international standard technique for moving image compression, moving picture experts group 4 (MPEG-4) (see, for example, Non Patent Document 2 and Non Patent Document 3).

Then, for the purpose of improving efficiency of a reproduction process and network distribution of a bitstream encoded by the V-PCC from a local storage, a method of storing a V-PCC bitstream in ISOBMFF has been studied (see, for example, Non Patent Document 4).

CITATION LIST

Non Patent Document

Non Patent Document 1: "Text of ISO/IEC DIS 23090-5 Video-based Point Cloud Compression", ISO/IEC JTC 1/SC 29/WG 11 N18670, 2019-10-10
Non Patent Document 2: "Information technology—Coding of audio-visual objects—Part 12: ISO base media file format", ISO/IEC 14496-12, 2015-02-20
Non Patent Document 3: "Information technology—Coding of audio-visual objects—Part 15: Carriage of network abstraction layer (NAL) unit structured video in the ISO base media file format", ISO/IEC FDIS 14496-15: 2014 (E), ISO/IEC JTC 1/SC 29/WG 11, 2014-01-13
Non Patent Document 4: "Revised Text of ISO/IEC CD 23090-10 Carriage of Video-based Point Cloud Coding Data", ISO/IEC JTC 1/SC 29/WG 11 N18606, 2019-11-08

SUMMARY OF THE INVENTION

Problems to be Solved by the Invention

However, in the definition described in Non Patent Document 4, signaling for identifying an atlas tile group necessary for constructing a partial point cloud of a specific 3D spatial region has not been defined. Therefore, it has been difficult to link the 3D spatial region and the atlas tile group with each other on a decoding side.

The present disclosure has been made in view of such a situation, and is to enable linking between a 3D spatial region and an atlas tile group.

Solutions to Problems

An image processing apparatus according to one aspect of the present technology is an image processing apparatus including: a selection unit configured to select a 3D spatial region and an atlas tile group that correspond to a desired three-dimensional space, on the basis of link information that is stored in a file together with a bitstream of a point cloud expressing an object having a three-dimensional shape as a set of points, the link information linking the 3D spatial region of the point cloud with the atlas tile group; an extraction unit configured to extract, from the file, an atlas NAL unit corresponding to the atlas tile group selected by the selection unit, and extract a bitstream corresponding to the 3D spatial region selected by the selection unit; and a decoding unit configured to decode the bitstream extracted by the extraction unit to generate 2D data corresponding to the 3D spatial region of the desired three-dimensional space, and decode the atlas NAL unit extracted by the extraction unit to generate atlas information corresponding to the 2D data.

An image processing method according to one aspect of the present technology is an image processing method including: selecting a 3D spatial region and an atlas tile group that correspond to a desired three-dimensional space, on the basis of link information that is stored in a file together with a bitstream of a point cloud expressing an object having a three-dimensional shape as a set of points, the link information linking the 3D spatial region of the point cloud with the atlas tile group; extracting, from the file, an atlas NAL unit corresponding to the selected atlas tile group, and extracting a bitstream corresponding to the selected 3D spatial region; and decoding the extracted bitstream to generate 2D data corresponding to the 3D spatial region of the desired three-dimensional space, and decoding the extracted atlas NAL unit to generate atlas information corresponding to the 2D data.

An image processing apparatus according to another aspect of the present technology is an image processing apparatus including: an encoding unit configured to encode 2D data to generate a bitstream, the 2D data corresponding to a 3D spatial region of a point cloud expressing an object having a three-dimensional shape as a set of points; a link information generation unit configured to generate link information that links the 3D spatial region with an atlas tile group; and a file generation unit configured to generate a file that stores the bitstream generated by the encoding unit and the link information generated by the link information generation unit.

An image processing method according to another aspect of the present technology is an image processing method including: encoding 2D data to generate a bitstream, the 2D data corresponding to a 3D spatial region of a point cloud expressing an object having a three-dimensional shape as a set of points; generating link information that links the 3D spatial region with an atlas tile group; and generating a file that stores the bitstream and the link information that have been generated.

In the image processing apparatus and method according to one aspect of the present technology, a 3D spatial region and an atlas tile group that correspond to a desired three-dimensional space are selected on the basis of link information that is stored in a file together with a bitstream of a point cloud expressing an object having a three-dimensional shape as a set of points, in which the link information links the 3D spatial region of the point cloud with the atlas tile group. Further, an atlas NAL unit corresponding to the selected atlas tile group and a bitstream corresponding to the selected 3D spatial region are extracted from the file, the extracted bitstream is decoded to generate 2D data corresponding to the 3D spatial region of the desired three-dimensional space, and the extracted atlas NAL unit is decoded to generate atlas information corresponding to the 2D data.

In the image processing apparatus and method according to another aspect of the present technology, 2D data corresponding to a 3D spatial region of a point cloud expressing an object having a three-dimensional shape as a set of points is encoded to generate a bitstream, link information is generated that links the 3D spatial region with an atlas tile group, and a file that stores the generated bitstream and link information is generated.

BRIEF DESCRIPTION OF DRAWINGS

FIG. 7 is a view illustrating examples of SpatialRegionGroupBox and VPCCSpatialRegionsBox.
FIG. 10 is a view for explaining signaling of link information.
FIG. 12 is a view illustrating an example of VPCCSpatialRegionsBox.
FIG. 14 is a view illustrating an example of SpatialRegionGroupBox.
FIG. 18 is a view illustrating an example of VPCCSpatialRegionsBox.
FIG. 19 is a view illustrating an example of VPCCSpatialRegionsBox.
FIG. 23 is a view illustrating an example of VPCCSpatialRegionsBox.
FIG. 25 is a view illustrating examples of VPCCSpatialRegionsBox and AlternativeRegionListStruct.
FIG. 26 is a view illustrating an example of AlternativeRegionListStruct.

MODE FOR CARRYING OUT THE INVENTION

Hereinafter, embodiments for implementing the present disclosure (hereinafter, referred to as embodiments) will be described. Note that the description will be given in the following order.

1. Signaling of link information
2. First embodiment (encoding device)
3. Second embodiment (decoding device)
4. Supplementary note 1. Signaling of Link Information <Documents and the Like that Support Technical Contents and Technical Terms>

The scope disclosed in the present technology includes, in addition to the contents described in the embodiments, contents described in the following Non Patent Documents and the like known at the time of filing, contents of other documents referred to in the following Non Patent Documents, and the like.

Non Patent Document 1: (described above)
Non Patent Document 2: (described above)
Non Patent Document 3: (described above)
Non Patent Document 4: (described above)
Non Patent Document 5: https://www.matroska.org/index-.html That is, the contents described in the above-described Non Patent Documents, the contents of other documents referred to in the above-described Non Patent Documents, and the like are also basis for determining the support requirement.

<Point Cloud>

Conventionally, there has been 3D data such as a point cloud representing a three-dimensional structure with point position information, attribute information, and the like.

For example, in a case of a point cloud, a three-dimensional structure (an object having a three-dimensional shape) is expressed as a set of a large number of points. The point cloud includes position information (also referred to as a geometry) and attribute information (also referred to as an attribute) of each point. The attribute can include any information. For example, color information, reflectance information, normal line information, and the like of each point may be included in the attribute. As described above, the point cloud has a relatively simple data structure, and can express any three-dimensional structure with sufficient accuracy by using a sufficiently large number of points.

<Outline of V-PCC>

Figure 1:
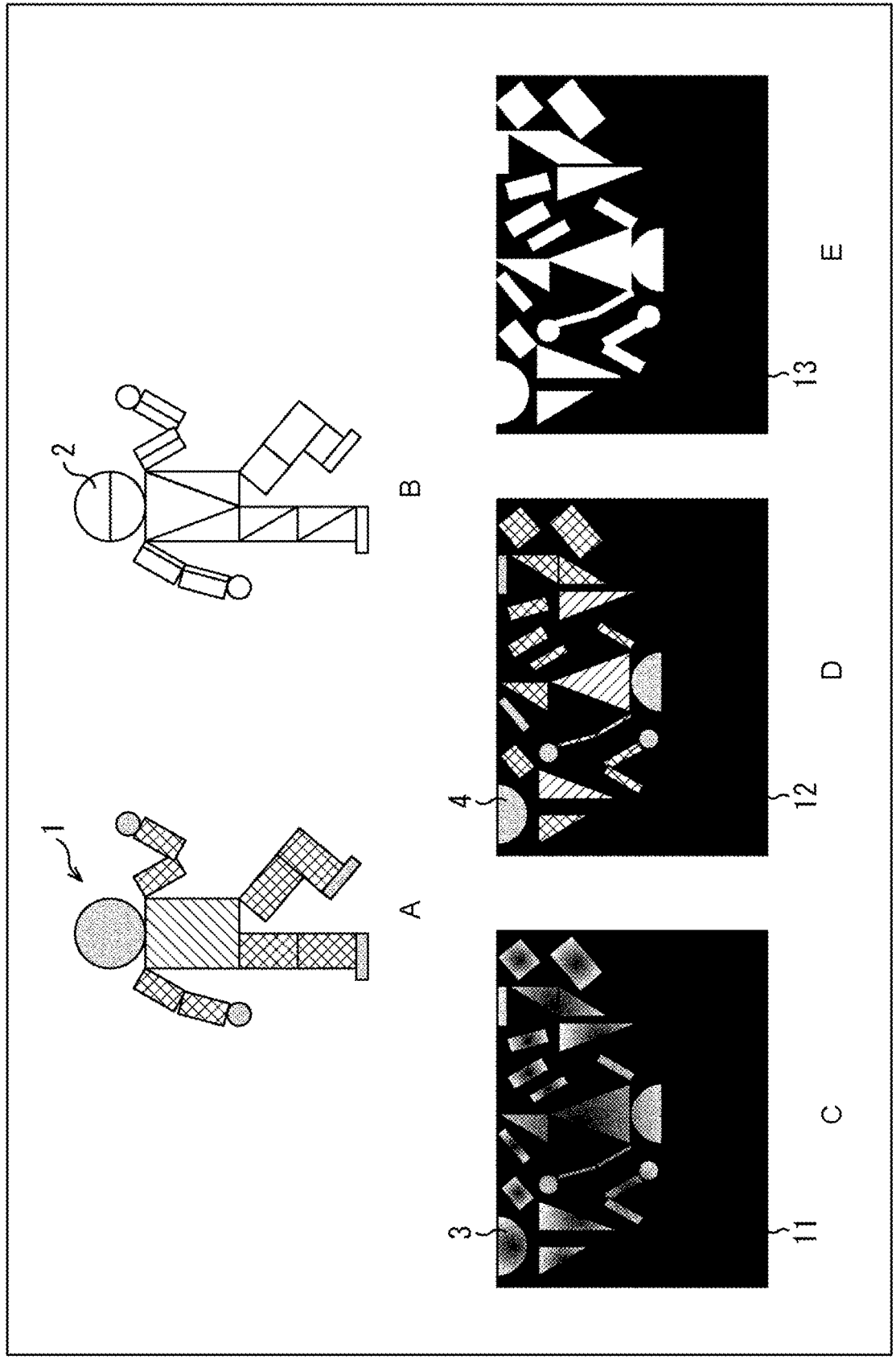
FIG. 1 is a view for explaining an outline of a V-PCC.

In video based point cloud compression (V-PCC), the geometry and the attribute of such a point cloud are projected on a two-dimensional plane for every small region. In the present disclosure, this small region may be referred to as a partial region. An image in which the geometry and the attribute are projected on a two-dimensional plane is also referred to as a projection image. Furthermore, the projection image for each small region (partial region) is referred to as a patch. For example, an object 1 (3D data) in A of FIG. 1 is decomposed into a patch 2 (2D data) as illustrated in B of FIG. 1. In a case of a patch of the geometry, each pixel value indicates position information of a point. However, in this case, the position information of the point is expressed as position information (a depth value (Depth)) in a direction (a depth direction) perpendicular to a projection plane thereof.

Then, each patch generated in this way is arranged in a frame image (also referred to as a video frame) of a video sequence. The frame image in which the patch of the geometry is arranged is also referred to as a geometry video frame. Furthermore, a frame image in which the patch of the attribute is arranged is also referred to as an attribute video frame. For example, from the object 1 in A of FIG. 1, a geometry video frame 11 in which a patch 3 of the geometry is arranged as illustrated in C of FIG. 1 and an attribute video frame 12 in which a patch 4 of the attribute is arranged as illustrated in D of FIG. 1 are generated. For example, each pixel value of the geometry video frame 11 indicates the depth value described above.

Then, these video frames are encoded by an encoding method for a two-dimensional image, such as, for example, advanced video coding (AVC) or high efficiency video coding (HEVC). That is, point cloud data that is 3D data representing a three-dimensional structure can be encoded using a codec for a two-dimensional image.

Note that an occupancy map can also be used. The occupancy map is map information indicating the presence or absence of a projection image (a patch) for every N×N pixels of the geometry video frame or the attribute video frame. For example, the occupancy map indicates, by a value "1", a region (N×N pixels) of the geometry video frame or the attribute video frame in which a patch is present, and indicates, by a value "0", a region (N×N pixels) in which no patch is present.

A decoder can grasp whether or not a patch is present in the region by referring to this occupancy map, so that an influence of noise or the like caused by encoding and decoding can be suppressed, and 3D data can be restored more precisely. For example, even if the depth value changes due to encoding and decoding, the decoder can ignore a depth value of a region where no patch is present by referring to the occupancy map. That is, the decoder can avoid processing as the position information of the 3D data, by referring to the occupancy map.

For example, for the geometry video frame 11 and the attribute video frame 12, an occupancy map 13 as illustrated in D of FIG. 1 may be generated. In the occupancy map 13, a white portion indicates the value "1", and a black portion indicates the value "0".

Such an occupancy map may be encoded as data (a video frame) separate from the geometry video frame and the attribute video frame, and transmitted to the decoding side. That is, similarly to the geometry video frame and the attribute video frame, the occupancy map can also be encoded by an encoding method for a two-dimensional image such as AVC or HEVC.

Coded data (a bitstream) generated by encoding the geometry video frame is also referred to as a geometry video sub-bitstream. Coded data (a bitstream) generated by encoding the attribute video frame is also referred to as an attribute video sub-bitstream. Coded data (a bitstream) generated by encoding the occupancy map is also referred to as an occupancy map video sub-bitstream. Note that the geometry video sub-bitstream, the attribute video sub-bitstream, and the occupancy map video sub-bitstream are referred to as a video sub-bitstream in a case where it is not necessary to distinguish from one another for description.

Moreover, atlas information (atlas), which is information for reconfiguring a point cloud (3D data) from a patch (2D data), is encoded and transmitted to the decoding side. Any encoding method (and decoding method) of the atlas information may be adopted. Coded data (a bitstream) generated by encoding the atlas information is also referred to as an atlas sub-bitstream.

Note that, in the following, it is assumed that (an object of) the point cloud may change in a time direction similarly to a moving image of a two-dimensional image. That is, the geometry data and the attribute data are assumed to be data having a concept of a time direction and sampled at predetermined time intervals, similarly to a moving image of a two-dimensional image. Note that, similarly to a video frame of a two-dimensional image, data at each sampling time is referred to as a frame. That is, point cloud data (geometry data and attribute data) is configured by a plurality of frames, similarly to a moving image of a two-dimensional image. In the present disclosure, the frame of the point cloud is also referred to as a point cloud frame. In a case of the V-PCC, even such a point cloud of a moving image (a plurality of frames) can be encoded with high efficiency by using a moving image encoding method, by converting each point cloud frame into a video frame to form a video sequence.

<Structure of V-PCC Bitstream>

An encoder multiplexes the coded data of the geometry video frame, the attribute video frame, the occupancy map, and the atlas information as described above to generate one bitstream. This bitstream is also referred to as a V-PCC bitstream.

Figure 2:
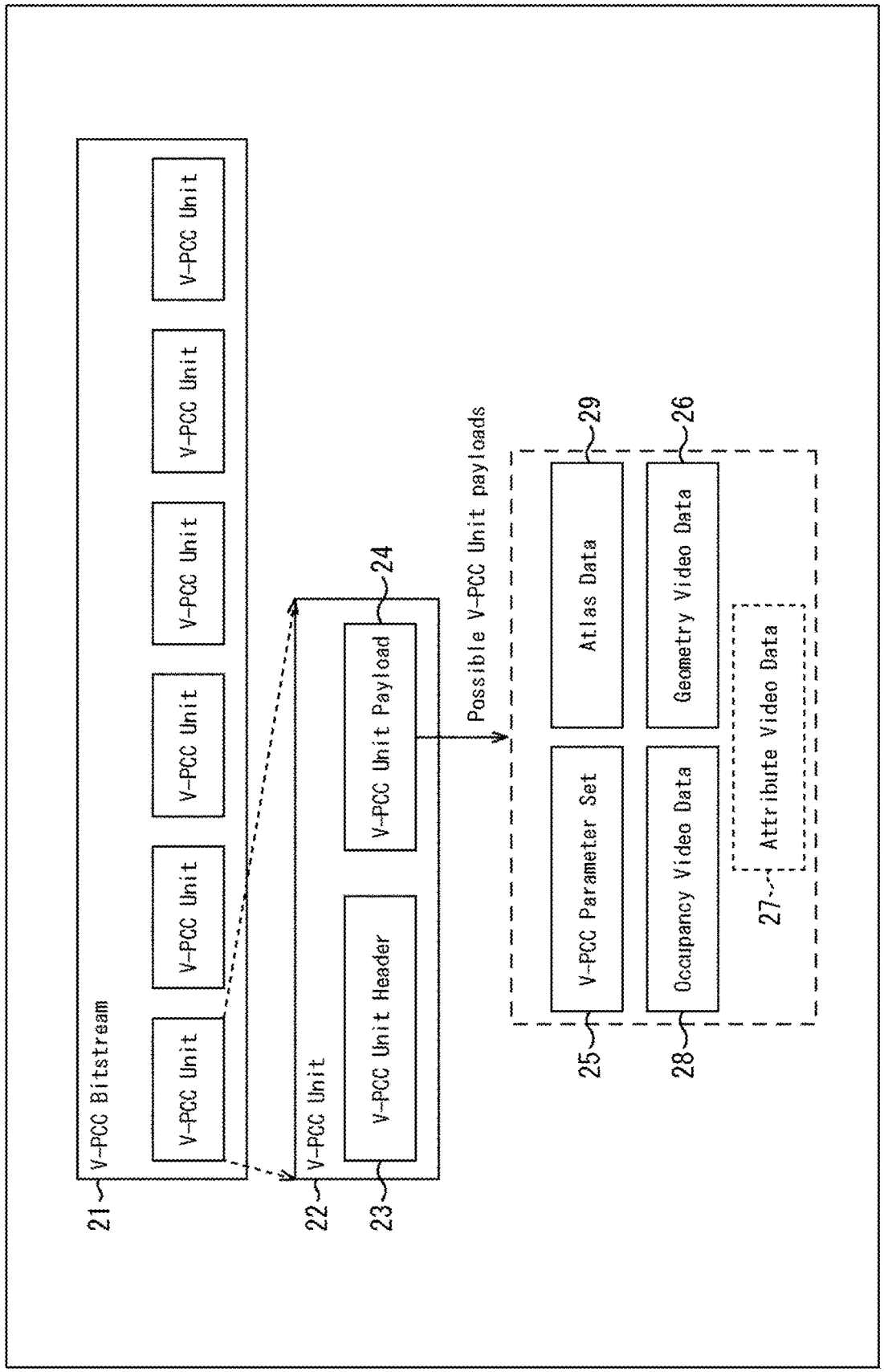
FIG. 2 is a diagram illustrating a main configuration example of a V-PCC bitstream.

FIG. 2 is a diagram illustrating a main configuration example of a V-PCC bitstream. As illustrated in FIG. 2, a V-PCC bitstream 21 includes a plurality of V-PCC units 22.

The V-PCC unit 22 includes a V-PCC unit header 23 and a V-PCC unit payload 24. The V-PCC unit header 23 includes information indicating a type of information to be stored in the V-PCC unit payload 24. The V-PCC unit payload 24 may store, depending on a type signaled in its V-PCC unit header 23, a V-PCC parameter set 25, a geometry video sub-bitstream 26 (Geometry Video Data), an attribute video sub-bitstream 27 (Attribute Video Data), an occupancy map video sub-bitstream 28 (Occupancy Video Data), an atlas sub-bitstream 29 (Atlas Data), or the like. The V-PCC parameter set 25 stores parameters related to the V-PCC unit 22.

<Structure of Atlas Sub-Bitstream>

Figure 3:
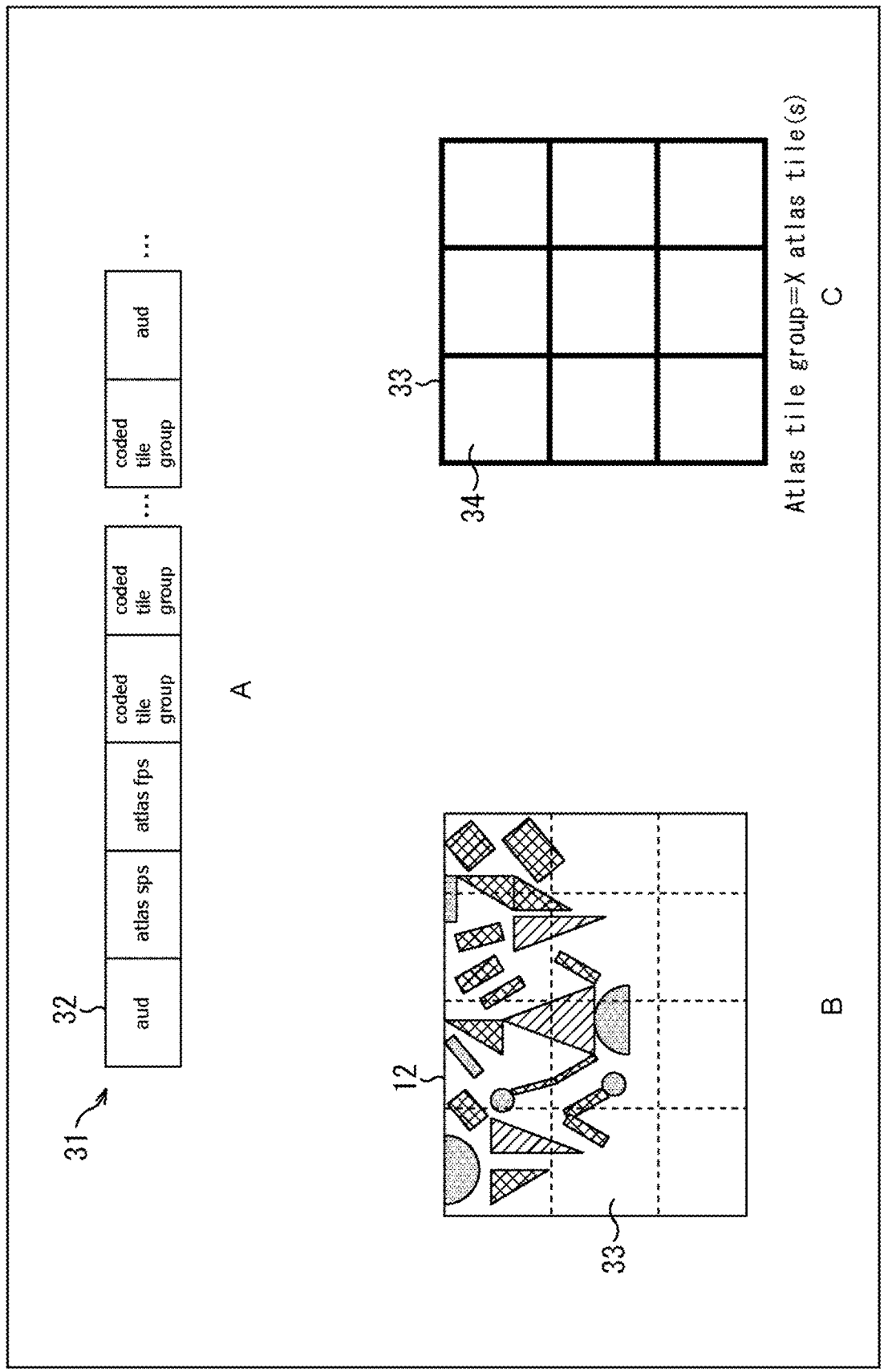
FIG. 3 is a view illustrating a main configuration example of an atlas sub-bitstream.

A of FIG. 3 is a view illustrating a main configuration example of an atlas sub-bitstream. As illustrated in A of FIG. 3, an atlas sub-bitstream 31 includes a sequence of atlas NAL units 32. Each square illustrated in A of FIG. 3 illustrates the atlas NAL unit 32.

aud is a NAL unit of an access unit delimiter. atlas sps is a NAL unit of an atlas sequence parameter set. atlas fps is a NAL unit of an atlas frame parameter set.

coded tile group is a NAL unit of a coded tile group. This NAL unit is also referred to as a coded tile group NAL unit. The coded tile group NAL unit has atlas tile group information. The atlas tile group information is information regarding an atlas tile group.

The atlas tile group has 2D3D conversion information corresponding to a patch of a corresponding rectangular region of a video sub-bitstream. The 2D3D conversion information is information for converting a patch, which is 2D data, into a point cloud, which is 3D data. For example, for the attribute video frame 12 illustrated in B of FIG. 3, atlas information is grouped for every rectangular region sectioned by a dotted line. That is, an atlas tile group 33 corresponding to each rectangular region is formed. As illustrated in C of FIG. 3, the atlas tile group 33 includes a plurality of atlas tiles 34.

Each atlas tile group is configured to be decodable independently of each other. Encoding of this atlas tile group has constraints equivalent to a tile of HEVC. For example, each atlas tile group is configured not to depend on other atlas tile groups in the same frame. Furthermore, atlas frames having a reference relationship have mutually the same atlas tile group partitioning. Moreover, reference is made only to an atlas tile group at the same position in a reference frame.

The position information indicating an in-frame position corresponding to the atlas tile group is signaled in the atlas frame parameter set (atlas fps). The position information is linked with a coded tile group NAL unit via id. That is, in the atlas frame parameter set, afti_tile_group_id is signaled as atlas tile group identification information that identifies the atlas tile group. In the coded tile group NAL unit, atgh_address is signaled as identification information that identifies position information of the atlas tile group. When these pieces of identification information (id) match, the position information of the atlas frame parameter set is linked with the coded tile group NAL unit. Note that one coded tile group NAL unit has information of one atlas tile group. That is, the coded tile group NAL unit and the atlas tile group are in one-to-one correspondence.

<Storage Method into ISOBMFF>

Non Patent Document 4 specifies two types of methods of storing a V-PCC bitstream into international organization for standardization base media file format (ISOBMFF): a multi-track structure and a single track structure.

Figure 4:
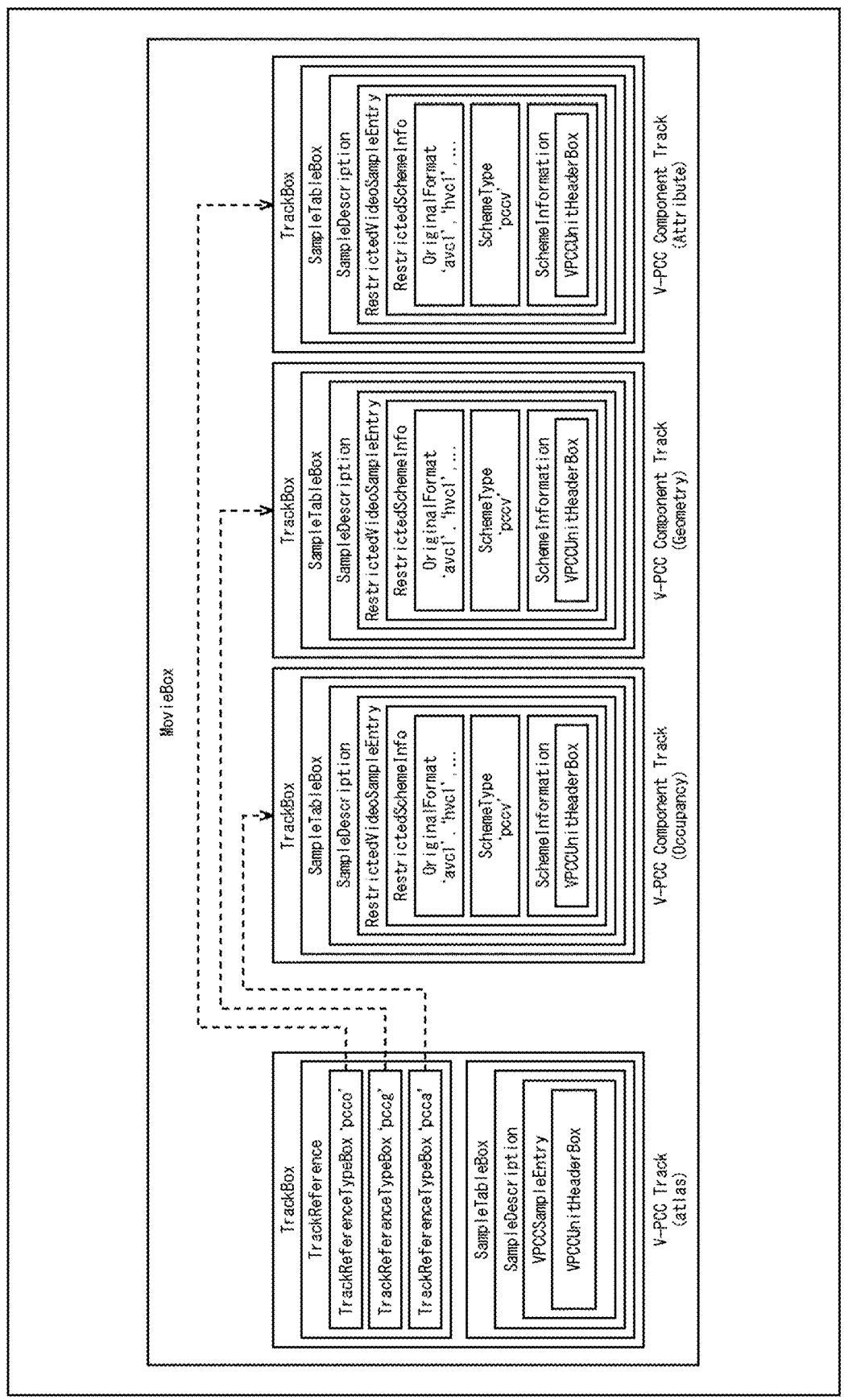
FIG. 4 is a diagram illustrating an example of a file structure.

The multi-track structure is a method of storing a geometry video sub-bitstream, an attribute video sub-bitstream, an occupancy map video sub-bitstream, and an atlas sub-bitstream, individually into separate tracks. Since each video sub-bitstream is a conventional 2D video stream, the video sub-bitstream can be stored (managed) in a similar manner to that of a case of 2D. FIG. 4 illustrates a configuration example of a file in a case where the multi-track structure is applied.

The single track structure is a method of storing a V-PCC bitstream into one track. That is, in this case, a geometry video sub-bitstream, an attribute video sub-bitstream, an occupancy map video sub-bitstream, and an atlas sub-bitstream are stored in mutually the same track.

<Partial Access>

Meanwhile, Non Patent Document 4 defines partial access information for acquiring and decoding a part of an object of a point cloud. For example, by using this partial access information, it is possible to perform control such as acquiring only information of a display portion of an object of a point cloud at a time of streaming distribution. By such control, it is possible to obtain an effect of achieving higher definition by effectively utilizing a bandwidth.

Figure 5:
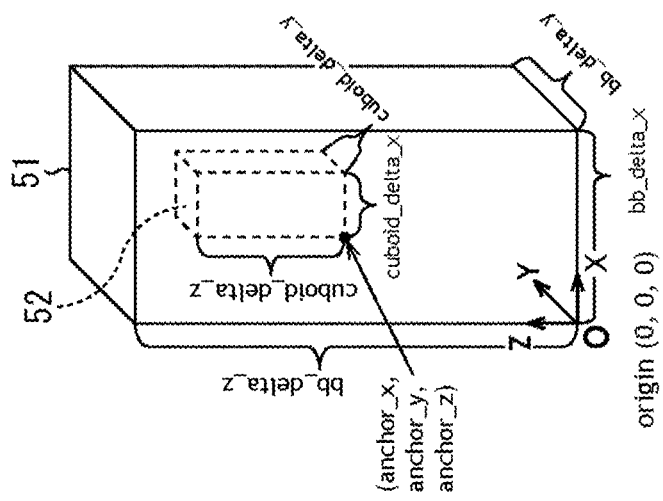
FIG. 5 is a view for explaining an example of partial access information.

For example, as illustrated in A of FIG. 5, it is assumed that a bounding box 51, which is a three-dimensional region including an object of a point cloud, is set for the object of the point cloud. That is, in the ISOBMFF, as illustrated in B of FIG. 5, bounding box information (3DBoundingBoxStruct), which is information regarding the bounding box 51, is set.

By setting the partial access information, as illustrated in A of FIG. 5, a 3D spatial region 52, which is an independently decodable partial region, can be set in the bounding box 51. That is, as illustrated in B of FIG. 5, 3D spatial region information (3dSpatialRegionStruct), which is information regarding the 3D spatial region 52, is set as partial access information in the ISOBMFF.

In the 3D spatial region information, the region is designated by coordinates (anchor_x, anchor_y, and anchor_z) of the reference point and a size (cuboid_delta_x, cuboid_delta_y, and cuboid_delta_z).

<Example of File Structure>

Figure 6:
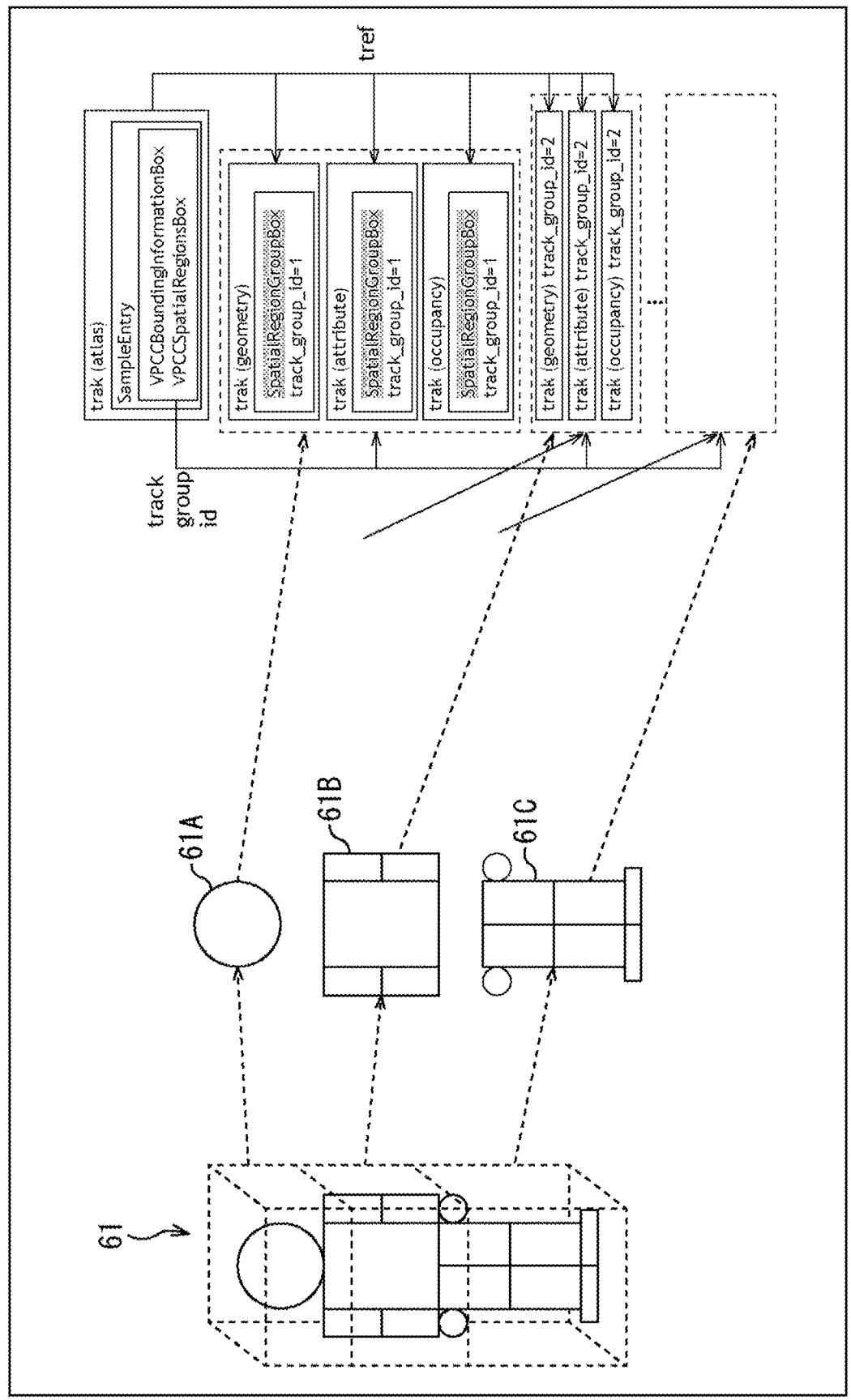
FIG. 6 is a diagram illustrating an example of a file structure.

For example, it is assumed that a bitstream of an object 61 in FIG. 6 is divided into three 3D spatial regions (a 3D spatial region 61A, a 3D spatial region 61B, and a 3D spatial region 61C) and stored in the ISOBMFF. Furthermore, it is assumed that the multi-track structure is applied and the 3D spatial region information is static (does not change in a time direction).

In this case, as illustrated on a right side of FIG. 6, a video sub-bitstream is stored separately for every 3D spatial region (in mutually different tracks). That is, individual tracks storing a geometry video sub-bitstream, an attribute video sub-bitstream, and an occupancy map video sub-bitstream corresponding to mutually the same 3D spatial region are grouped (a dotted frame in FIG. 6). This group is also referred to as a spatial region track group.

Note that a video sub-bitstream of one 3D spatial region is stored in one or more spatial region track groups. In the case of the example of FIG. 6, since three 3D spatial regions are configured, three or more spatial region track groups are formed.

To each spatial region track group, track_group_id is assigned as track group identification information, which is identification information that identifies a spatial region track group. This track_group_id is signaled to each track. That is, to tracks belonging to mutually the same spatial region track group, track_group_id having mutually the same value is signaled. Therefore, on the basis of the value of track_group_id, tracks belonging to a desired spatial region track group can be identified.

In other words, to individual tracks storing the geometry video sub-bitstream, the attribute video sub-bitstream, and the occupancy map video sub-bitstream corresponding to mutually the same 3D spatial region, track_group_id of mutually the same value is signaled. Therefore, on the basis of this value of track_group_id, each video sub-bitstream corresponding to a desired 3D spatial region can be identified.

More specifically, as illustrated in FIG. 7, SpatialRegionGroupBox having mutually the same track_group_id is signaled to tracks belonging to mutually the same spatial region track group. track_group_id is signaled in TrackGroupTypeBox inherited by SpatialRegionGroupBox.

Note that the atlas sub-bitstream is stored in one track regardless of the 3D spatial region. That is, this one atlas sub-bitstream has 2D3D conversion information regarding patches of a plurality of 3D spatial regions. More specifically, in a track in which the atlas sub-bitstream is stored, as illustrated in FIG. 7, VPCCSpatialRegionsBox is signaled, where each track_group_id is signaled.

Figure 8:
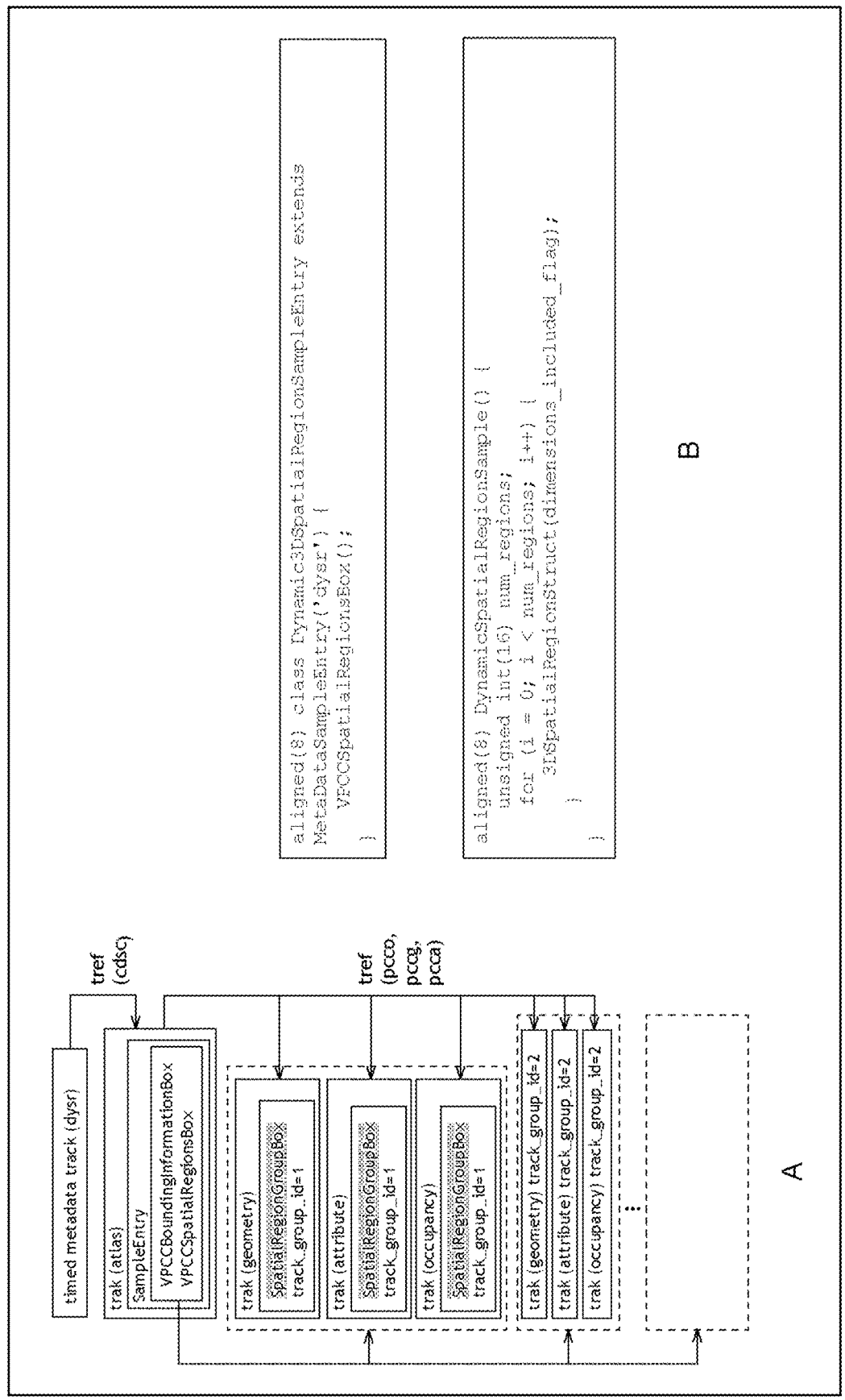
FIG. 8 is a diagram illustrating an example of a file structure.

Note that, in a case where the 3D spatial region information is dynamic (changes in a time direction), as illustrated in A of FIG. 8, it suffice that the 3D spatial region at each time is expressed using a timed metadata track. That is, as illustrated in B of FIG. 8, Dynamic3DSpatialRegionSampleEntry and DynamicSpatialRegionSample are signaled.

<Decoding Process of Partial Access>

A decoding process in a case of partial access is performed by procedures as follows.

1. On the basis of information of VPCCSpatialRegionBox, track_group_id of SpatialRegionGroupBox corresponding to a 3D spatial region desired to be accessed is identified.

2. A video sub-bitstream of a track belonging to the SpatialRegionGroupBox of the track_group_id is decoded.

3. A necessary coded tile group NAL unit is extracted from an atlas sub-bitstream and decoded.

4. A point cloud corresponding to the 3D spatial region is constructed.

As described above in <Example of file structure>, the atlas sub-bitstream corresponding to all the 3D spatial regions is stored in one track. A general-purpose decoder decodes all the atlas tile groups included in the inputted atlas sub-bitstream. That is, the general-purpose decoder cannot extract and decode the atlas tile groups partially. Then, when a point cloud is constructed, if the video sub-bitstreams corresponding to the atlas information are not prepared, an error occurs.

That is, in a case where partial access is performed and spatial region track groups are decoded only partially by the general-purpose decoder as in the procedures 1 and 2 described above, when the entire atlas sub-bitstream is decoded, the video sub-bitstreams are insufficient in constructing the point cloud, and an error occurs. Therefore, in that case, as in the procedure 3, it is necessary to extract the coded tile group NAL unit corresponding to the spatial region track group from the atlas sub-bitstream, and input to the general-purpose decoder. That is, it is necessary to exclude information of an unnecessary atlas tile group from the decoding target.

Figure 9:
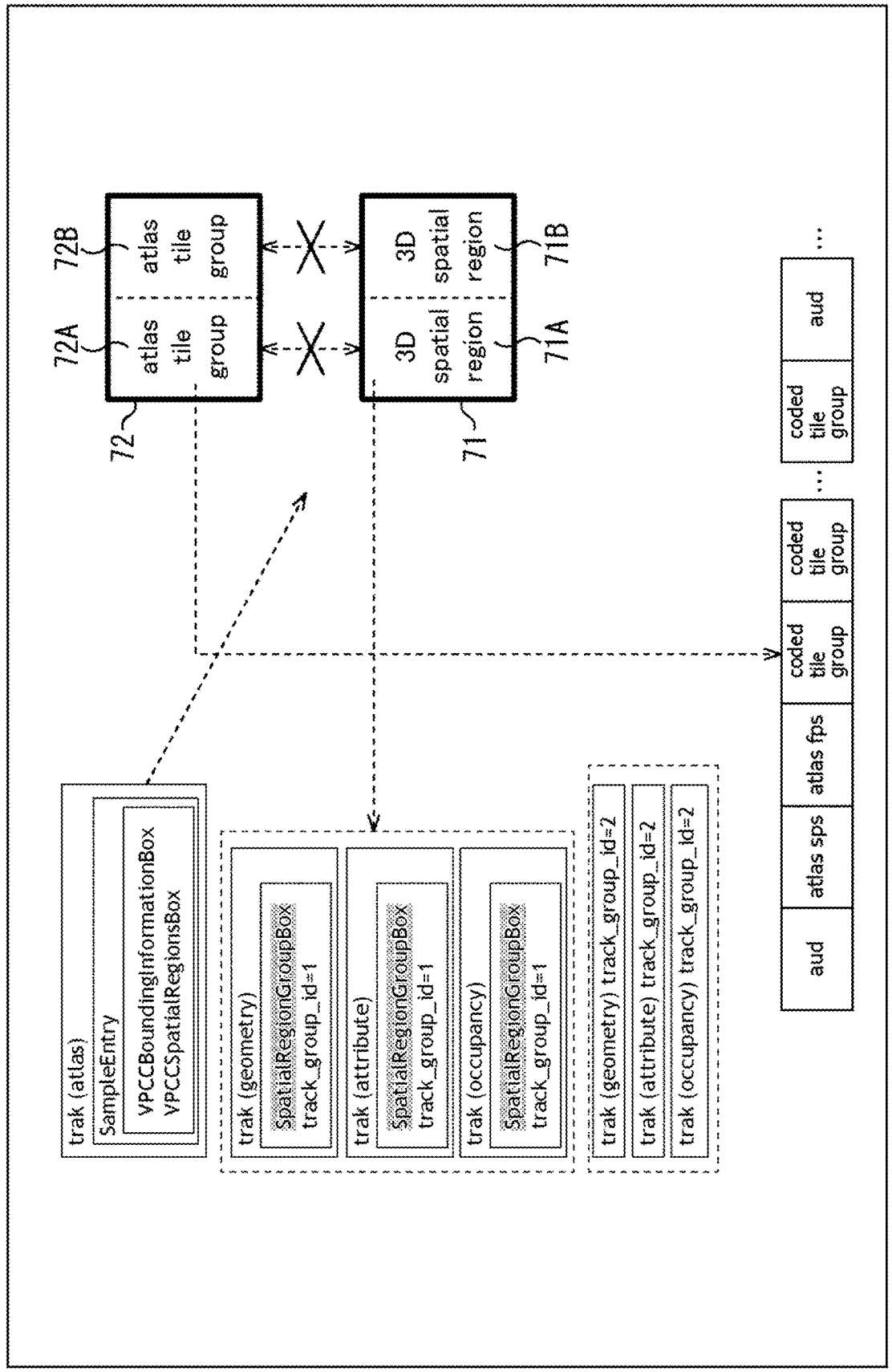
FIG. 9 is a diagram illustrating an example of a file structure.

For example, as illustrated in FIG. 9, it is assumed that video frame partial regions 71A and 71B corresponding to different 3D spatial regions are present in a video frame 71 of a video sub-bitstream. In a case where only the video frame partial region 71A is decoded, only a coded tile group NAL unit of an atlas tile group 72A corresponding to the video frame partial region 71A is inputted to the general-purpose decoder. Furthermore, in a case where only the video frame partial region 71B is decoded, only a coded tile group NAL unit of an atlas tile group 72B corresponding to the video frame partial region 71B is inputted to the general-purpose decoder.

However, in Non Patent Document 4, the 3D spatial region and the atlas tile group have not been linked with each other. That is, the video frame partial region of the video sub-bitstream has not been linked with the coded tile group NAL unit. Therefore, it has been difficult to perform the procedure 3 described above. That is, it has been difficult to extract and decode a coded tile group NAL unit corresponding to a desired 3D spatial region (spatial region track group) from the atlas sub-bitstream. Therefore, it has been difficult to construct a point cloud (also referred to as a partial point cloud) of the desired 3D spatial region.

<Information that Links 3D Spatial Region with Atlas Tile Group>

Therefore, information (also referred to as link information) that links a 3D spatial region with an atlas tile group is transmitted (signaled) from the encoding side to the decoding side. For example, as the link information, information that links a spatial region track group with an atlas tile group is signaled.

For example, in an image processing method (or an encoding method), 2D data corresponding to a 3D spatial region of a point cloud expressing an object having a three-dimensional shape as a set of points is encoded to generate a bitstream, link information that links the 3D spatial region and an atlas tile group with each other is generated, and a file that stores the generated bitstream and link information is generated.

For example, in an image processing apparatus (or an encoding device), there are provided: an encoding unit configured to encode 2D data to generate a bitstream, the 2D data corresponding to a 3D spatial region of a point cloud expressing an object having a three-dimensional shape as a set of points; a link information generation unit configured to generate link information that links the 3D spatial region with an atlas tile group; and a file generation unit configured to generate a file that stores the bitstream generated by the encoding unit and the link information generated by the link information generation unit.

The 2D data corresponding to the 3D spatial region is, for example, data of a partial region including a patch corresponding to the 3D spatial region, in a geometry video frame, an attribute video frame, and an occupancy map video frame. The bitstream generated by encoding the 2D data is, for example, a geometry video sub-bitstream, an attribute video sub-bitstream, and an occupancy map video sub-bitstream that are stored in a track belonging to a spatial region track group corresponding to the 3D spatial region. The file that stores the bitstream and the link information is, for example, a file of the ISOBMFF.

For example, in an image processing method (or decoding method), a 3D spatial region and an atlas tile group that correspond to a desired three-dimensional space are selected on the basis of link information that is stored in a file together with a bitstream of a point cloud expressing an object having a three-dimensional shape as a set of points, in which the link information links the 3D spatial region of the point cloud with the atlas tile group. Further, an atlas NAL unit corresponding to the selected atlas tile group and a bitstream corresponding to the selected 3D spatial region are extracted from the file, the extracted bitstream is decoded to generate 2D data corresponding to the 3D spatial region of the desired three-dimensional, and the extracted atlas NAL unit is decoded to generate atlas information corresponding to the 2D data.

For example, in an image processing apparatus (or a decoding device), there are provided: a selection unit configured to select a 3D spatial region and an atlas tile group that correspond to a desired three-dimensional space on the basis of link information that is stored in a file together with a bitstream of a point cloud expressing an object having a three-dimensional shape as a set of points, the link information linking the 3D spatial region of the point cloud with the atlas tile group; an extraction unit configured to extract, from the file, an atlas NAL unit corresponding to the atlas tile group selected by the selection unit, and extract a bitstream corresponding to the 3D spatial region selected by the selection unit; and a decoding unit configured to decode the bitstream extracted by the extraction unit to generate 2D data corresponding to the 3D spatial region of the desired three-dimensional space, and decode the atlas NAL unit extracted by the extraction unit to generate atlas information corresponding to the 2D data.

The file that stores the bitstream and the link information is, for example, a file of the ISOBMFF. The bitstream corresponding to the 3D spatial region is, for example, a geometry video sub-bitstream, an attribute video sub-bitstream, and an occupancy map video sub-bitstream that are stored in a track belonging to a spatial region track group corresponding to the 3D spatial region. The 2D data corresponding to the 3D spatial region is, for example, data of a partial region including a patch corresponding to the 3D spatial region, in a geometry video frame, an attribute video frame, and an occupancy map video frame.

By doing this way, the 3D spatial region and the atlas tile group can be linked with each other on the decoding side. Therefore, the coded tile group NAL unit and the video sub-bitstream necessary for constructing the partial point cloud of the desired 3D spatial region can be extracted and inputted to the general-purpose decoder. Thus, only the partial point cloud of the desired 3D spatial region can be constructed and displayed.

For example, it is possible to obtain an effect of effectively utilizing a bandwidth to achieve higher definition, by acquiring only a viewing portion of an object of a point cloud at a time of streaming distribution. Such a point cloud object distribution technology is expected to be utilized for six degrees of freedom (6DoF) content distribution in augmented reality (AR) and virtual reality (VR) applications.

Furthermore, since the general-purpose decoder can be used, it is possible to suppress an increase in cost as compared with a case of developing a dedicated decoder having a function capable of extracting, from an atlas sub-bitstream, a coded tile group NAL unit necessary for constructing a partial point cloud of a desired 3D spatial region, and decoding.

<Method 1>

For example, as illustrated in the uppermost row of a table illustrated in FIG. 10, a spatial region track group may be linked with an atlas tile group in the multi-track structure (Method 1).

For example, the link information described above in <Information that links 3D spatial region with atlas tile group> may include information that links an atlas tile group with a spatial region track group, which is a group of tracks to store bitstreams corresponding to mutually the same 3D spatial region, in the multi-track structure.

An encoding-side device signals such link information. A decoding-side device decodes a 3D spatial region on the basis of the signaled link information. By doing this way, the decoding-side device can extract only an atlas NAL unit constituting a portion corresponding to a 3D spatial region desired to be accessed, in the atlas sub-bitstream. That is, the decoding-side device can decode only portions of the video sub-bitstream and the atlas sub-bitstream corresponding to the 3D spatial region by the general-purpose decoder. That is, the decoding-side device can construct only a portion of the point cloud corresponding to the 3D spatial region.

<Method 1-1>

Furthermore, as illustrated in the second row from the top of the table illustrated in FIG. 10, tile_group_id may be linked to track_group_id (Method 1-1).

For example, the information that links the spatial region track group with the atlas tile group described above in <Method 1> may include information that links track group identification information that identifies a track that stores a bitstream with atlas tile group identification information that identifies an atlas tile group.

Figure 11:
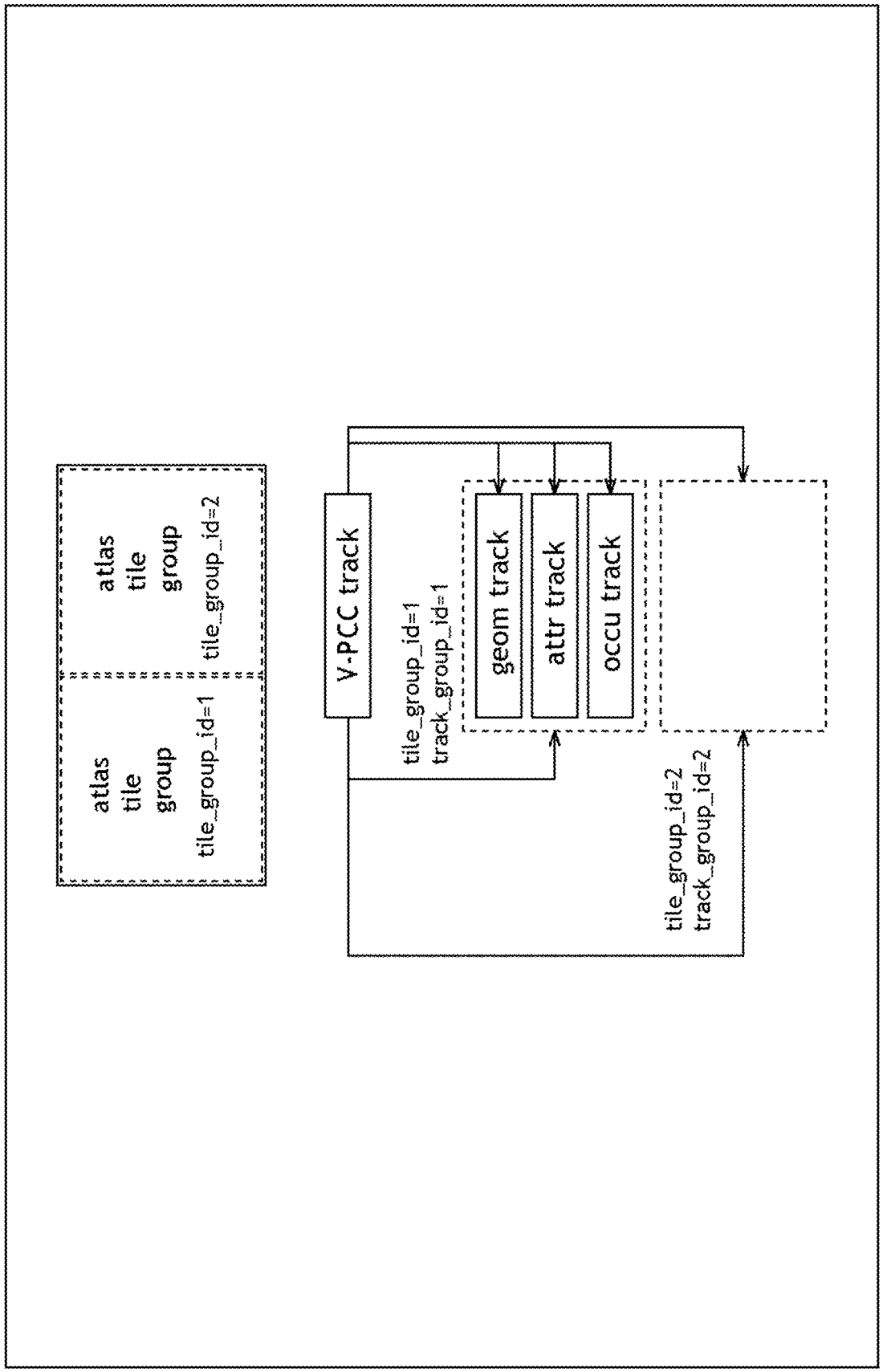
FIG. 11 is a diagram for explaining a link between track group identification information and tile group identification information.

This bitstream is, for example, the video sub-bitstream described above. The track group identification information is, for example, track_group_id. The atlas tile group identification information is, for example, tile_group_id. For example, as illustrated in FIG. 11, the spatial region track group and the atlas tile group can be linked with each other by linking track_group_id and tile_group_id with each other.

The encoding-side device signals link information including information that links such track group identification information and atlas tile group identification information. The decoding-side device decodes a 3D spatial region on the basis of the signaled link information. By doing this way, on the basis of the link information, the decoding-side device can specify atlas tile group identification information corresponding to (track group identification information corresponding to) a desired 3D spatial region. Then, by using the specified atlas tile group identification information, the decoding-side device can specify the atlas NAL unit corresponding to the desired 3D spatial region.

For example, track_group_id and tile_group_id may be linked with each other by extending VPCCSpatialRegionsBox of the ISOBMFF. That is, the information that links the track group identification information with the atlas tile group identification information may link the track group identification information with the atlas tile group identification information by using the VPCCSpatialRegionsBox of the ISOBMFF.

An extension example of such VPCCSpatialRegionsBox is illustrated in FIG. 12. In the case of the example of FIG. 12, tile_group_id is linked with each track_group_id in VPCCSpatialRegionsBox. This tile_group_id has the same value as that of atgh_address signaled in an atlas tile group header (atlas_tile_group_header). In this case, one or a plurality of atlas tile groups may be linked to one piece of one spatial region track group.

For example, track_group_id and tile_group_id may be linked with each other by extending SpatialRegionGroupBox of the ISOBMFF. That is, the information that links the track group identification information with the atlas tile group identification information may link the track group identification information with the atlas tile group identification information by using the SpatialRegionGroupBox of the ISOBMFF.

For example, signaling of num_tile groups may be omitted. In that case, one atlas tile group corresponds to one spatial region track group.

Figure 13:
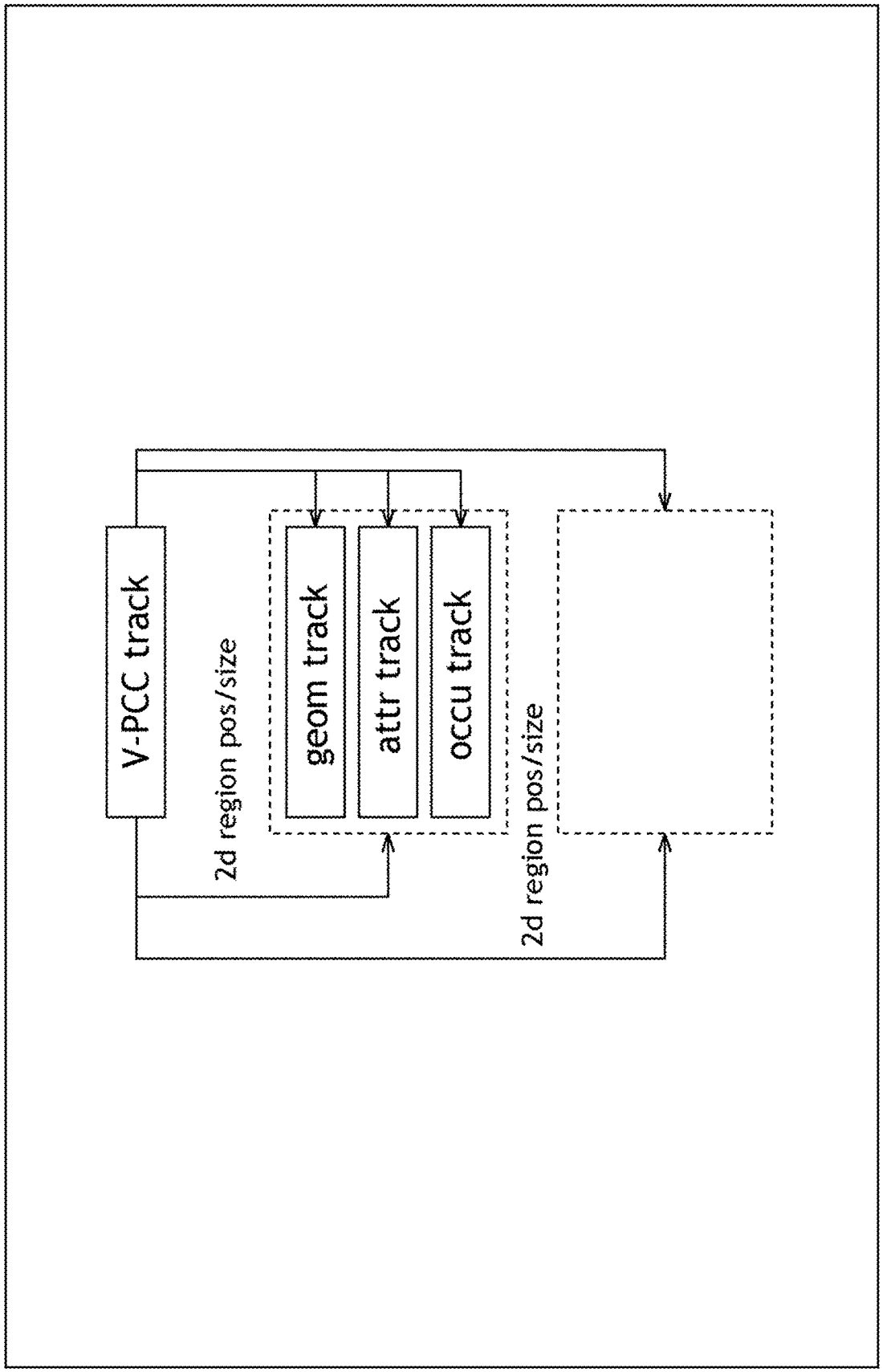
FIG. 13 is a diagram for explaining a link using division information of a video sub-bitstream.

Furthermore, sub-division information of the video sub-bitstream may be linked to the spatial region track group. That is, as illustrated in FIG. 13, the spatial region track group and the atlas tile group may be linked using division information (a division position and a size (2d region pos/size)) of the video sub-bitstream instead of atlas tile group id.

That is, the information that links the spatial region track group with the atlas tile group described above in <Method 1> may include information that links the spatial region track group with the atlas tile group by using partial region information of a video frame corresponding to the 3D spatial region.

An extension example of SpatialRegionGroupBox in that case is illustrated in FIG. 14. In the case of this example, in TrackGroupTypeBox of SpatialRegionGroupBox, a position (offset_x and offset_y) and a size (width, height, total_width, and total_height) of a partial region of a video frame corresponding to a 3D spatial region (a spatial region track group) are signaled. Furthermore, the position and the size of the atlas tile group are signaled in atlas fps as described above with reference to FIG. 3. The spatial region track group and the atlas tile group are linked with each other when such position information and size match.

The encoding-side device signals link information that links a spatial region track group with an atlas tile group by using partial region information of a video frame corresponding to the 3D spatial region. The decoding-side device decodes the 3D spatial region on the basis of the signaled link information. By doing this way, the decoding-side device can specify an atlas NAL unit corresponding to the desired 3D spatial region on the basis of the division information.

Note that all the video sub-bitstreams may be stored in one track as a multiplexed track. Furthermore, instead of SpatialRegionGroupBox, VPCC SpatialRegionsBox may be extended.

Note that, in the case of this Method 1-1, parsing of the atlas sub-bitstream is required to identify the atlas tile group corresponding to the desired spatial region track group.
<Method 1-2>

Furthermore, as illustrated in the third row from the top of the table illustrated in FIG. 10, groupID may be newly assigned to link (Method 1-2).

For example, the information that links the spatial region track group with the atlas tile group described above in <Method 1> may include information that links track group identification information that identifies a track that stores a bitstream with group identification information that identifies the atlas tile group to which the atlas NAL unit belongs.

This bitstream is, for example, the video sub-bitstream described above. The track group identification information is, for example, track_group_id. The group identification information is identification information to be newly assigned, and is, for example, groupID. The groupID is identification information that identifies the atlas tile group to which the atlas NAL unit belongs, and is assigned to each atlas NAL unit.

Figure 15:
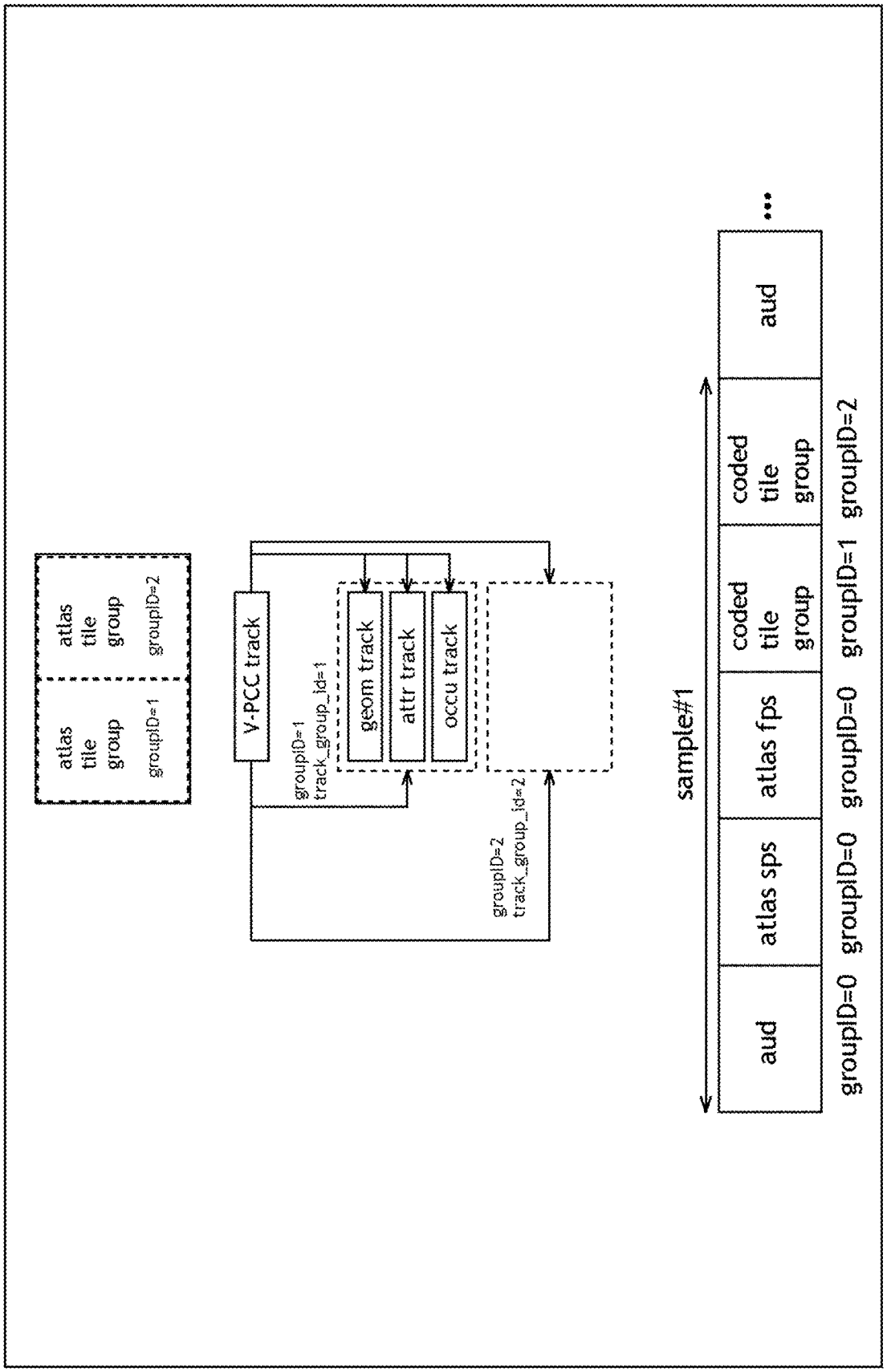
FIG. 15 is a diagram for explaining a link using group identification information.

Therefore, for example, as illustrated in FIG. 15, the spatial region track group and the atlas tile group can be linked with each other by linking track_group_id with groupID with each other. In the case of the example of FIG. 15, groupID=1 is assigned to (the atlas NAL unit of) the atlas tile group corresponding to the spatial region track group of track_group_id=1, and groupID=2 is assigned to (the atlas NAL unit of) the atlas tile group corresponding to the spatial region track group of track_group_id=2. Note that grou-pID=0 is assigned to the atlas NAL units of aud, atlas sps, and atlas fps. groupID=0 indicates that the data is necessary for decoding all the atlas tile groups.

The encoding-side device signals link information including information that links such a spatial region track group and an atlas tile group with each other. The decoding-side device decodes the 3D spatial region on the basis of the signaled link information. By doing this way, on the basis of the link information, the decoding-side device can specify group identification information corresponding to (track group identification information corresponding to) a desired 3D spatial region. Then, by using the specified group identification information, the decoding-side device can specify the atlas NAL unit corresponding to the desired 3D spatial region.

Figure 16:
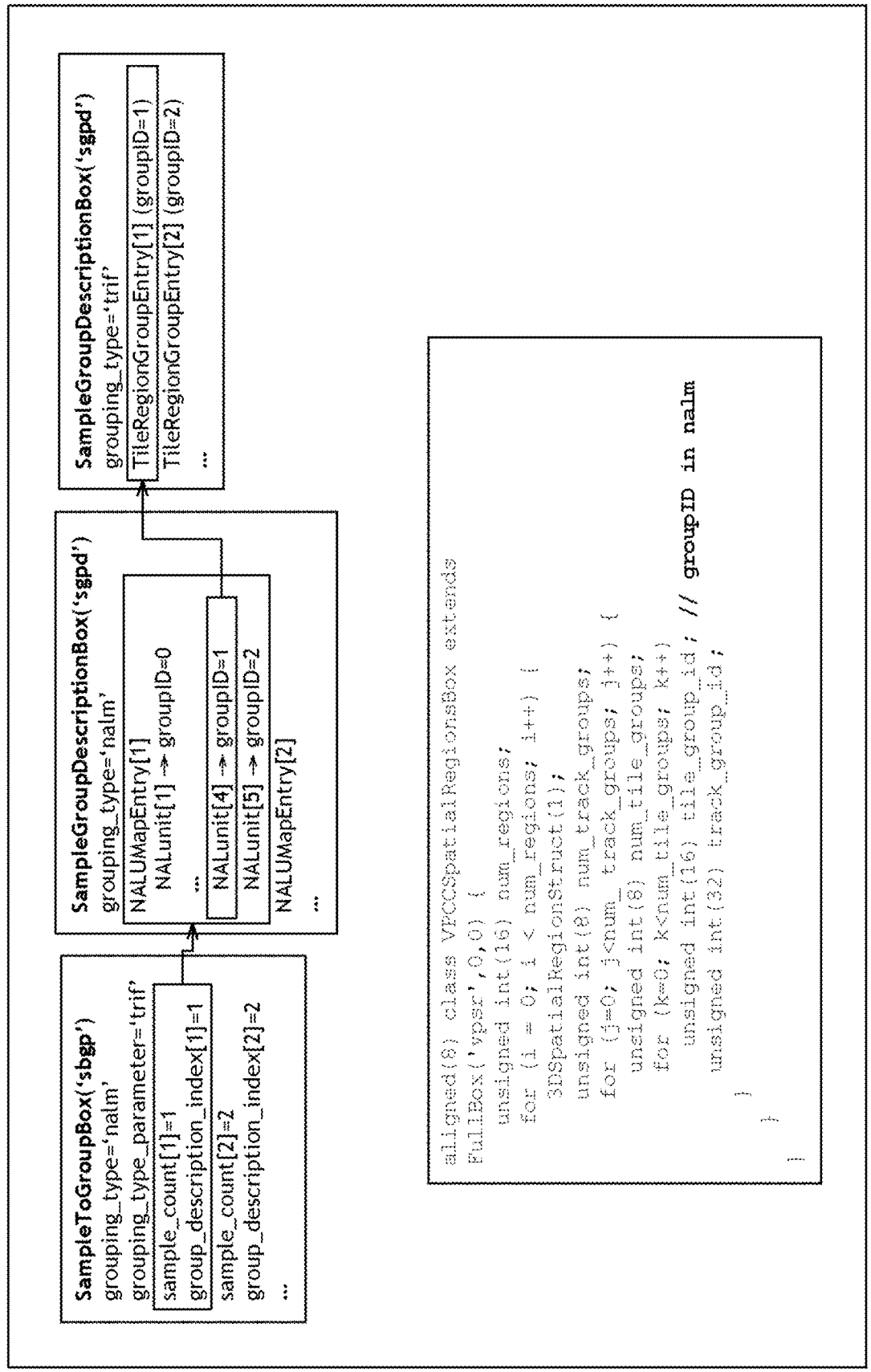
FIG. 16 is a diagram for explaining a link using group identification information.

Note that, as illustrated in FIG. 16, this group identification information may link an atlas NAL unit and an atlas tile group for each sample by using SampleToGroupBox of the ISOBMFF.

Furthermore, for example, the spatial region track group may be linked with (an atlas NAL unit constituting) the atlas tile group by using NALUMapEntry ('nalm') and TileRegionGroupEntry ('trif') defined in Non Patent Document 3. For example, in the group identification information described above, as illustrated on an upper side of FIG. 16, the atlas NAL unit and the atlas tile group may be linked using NALUMapEntry and TileRegionGroupEntry of the ISOBMFF.

In the case of the example of FIG. 16, by using sample_count [1] and group_description_index [1] of SampleToGroupBox, NALUMapEntry [1] of SampleGroupDescriptionBox, and TileRegionGroupEntry [1] of SampleGroupDescriptionBox, the spatial region track group is linked with (the atlas NAL unit constituting) the atlas tile group.

The encoding-side device signals such link information. The decoding-side device decodes the 3D spatial region on the basis of the signaled link information. By doing this way, the decoding-side device can specify an atlas NAL unit corresponding to the desired 3D spatial region on the basis of the link information.

For example, as illustrated on a lower side of FIG. 16, track_group_id and groupID may be linked with each other by extending VPCCSpatialRegionsBox of the ISOBMFF. For example, the information that links the track group identification information with the group identification information described above may link the track group identification information with the group identification information by using the VPCCSpatialRegionsBox of the ISOBMFF.

Syntax for the VPCCSpatialRegionsBox illustrated in FIG. 16 is similar to the example of FIG. 12 (Method 1-1). However, semantics of tile_group_id is groupID of 'nalm'. Note that the semantics of tile_group_id may be the same as the case described above in <Method 1-1>, and (groupID−1) may be set to be tile_group_id of the atlas tile group NAL unit.

Note that all the video sub-bitstreams may be stored in one track as a multiplexed track. Furthermore, a signal of trif may be omitted.

Note that, in the case of Method 1-2, since the groupID is newly assigned to the atlas NAL unit, it is possible to identify an atlas tile group corresponding to a desired spatial region track group without parsing all the atlas sub-bitstream.

Note that AtlasNALUMapEntry may be defined and used for the atlas sub-bitstream. Syntax and semantics thereof may be the same as those of NALUMapEntry. Furthermore, the NALUMapEntry may also be extended to signal that the atlas NAL unit is being referred to. Since there is a difference in syntax between an HEVC NAL unit and an atlas NAL unit, it is possible to clearly indicate to a client that parsing and decoding are different, and it is possible to facilitate switching of processing.

<Method 1-3>

Furthermore, as illustrated in the fourth row from the top of the table illustrated in FIG. 10, the video sub-bitstream may be encoded by an encoding method (HEVC tile) to which a tile of high efficiency video coding (HEVC) is applied, and the tile of HEVC may be linked with the atlas tile group (Method 1-3).

Figure 17:
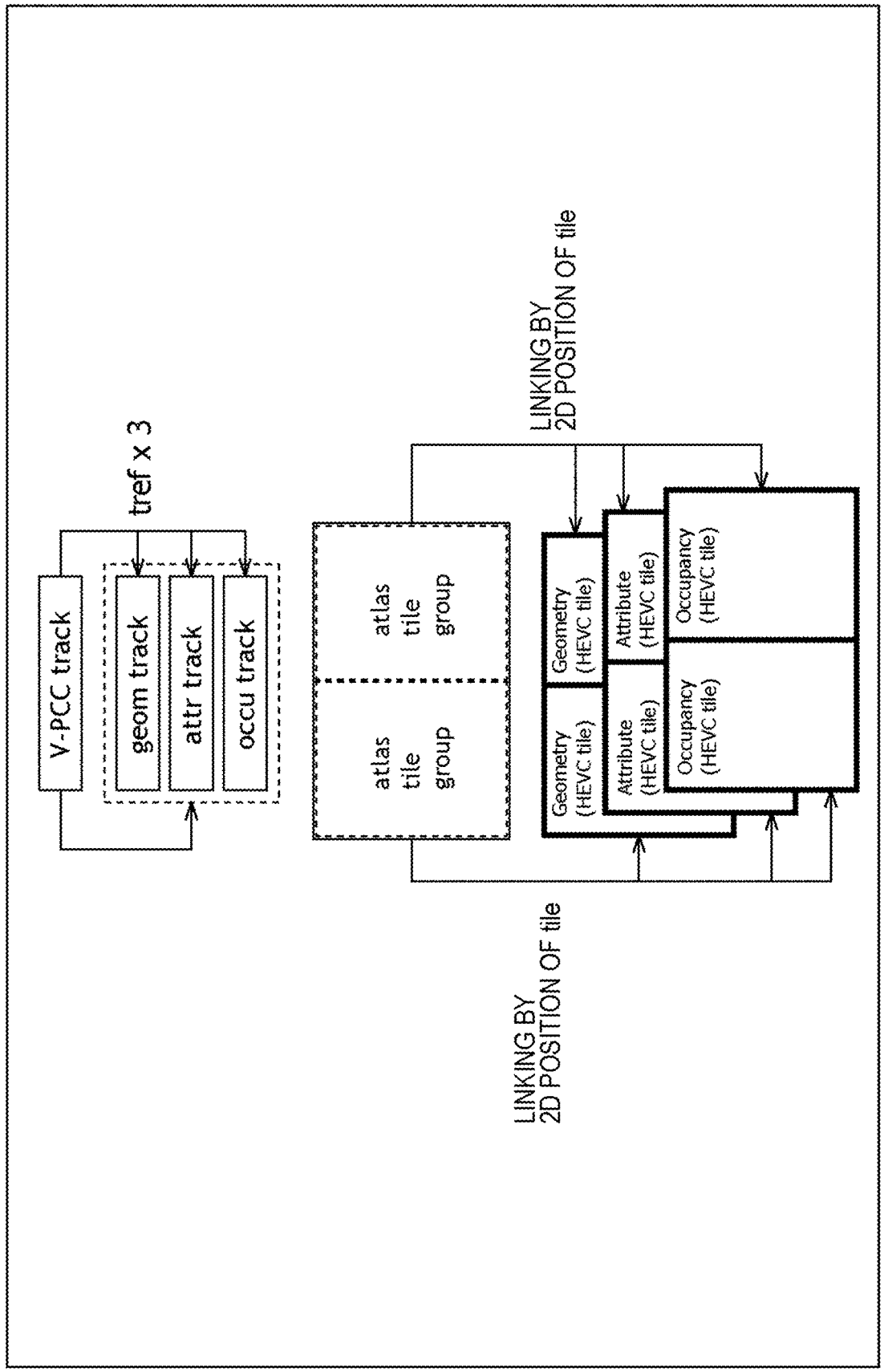
FIG. 17 is a diagram for explaining a link using a tile of HEVC.

That is, each video sub-bitstream is encoded as a tile of HEVC for every spatial region track group. Then, as illustrated in FIG. 17, the tile of HEVC (that is, the spatial region track group) may be linked with the atlas tile group by using a 2D position (that is, at mutually the same position).

For example, the information that links the spatial region track group with the atlas tile group described above in <Method 1> may include information that links the atlas tile group with a bitstream corresponding to a tile of HEVC at the same position as the atlas tile group.

The encoding-side device signals such link information. The decoding-side device decodes only tiles at corresponding positions of individual video sub-bitstreams (the geometry track/the attribute track/the occupancy map track), on the basis of position information of an atlas tile group of a signaled tile_group_id.

At this time, the decoding-side device can identify individual tile region positions of the geometry track, the attribute track, and the occupancy map track from trif signaled in each track. Therefore, the decoding-side device can extract and decode a NAL unit constituting a tile region of each video sub-bitstream that matches a tile region of the atlas tile group.

As illustrated in FIG. 18, by extending VPCCSpatialRegionsBox of the ISOBMFF, the atlas tile group may be linked with a bitstream corresponding to a tile of HEVC at the same position as the atlas tile group. Syntax in this case is similar to that of the example (Method 1-2) in FIG. 16. However, the number of spatial region track groups is one.

Note that the use of the spatial region track group may be made optional to eliminate necessity of signaling of SpatialRegionGroupBox. Each track of the geometry, the attribute, and the occupancy map is linked with a V-PCC track by a track reference, and signaling of SpatialRegionGroupBox can be omitted. An extension example of the VPCCSpatialRegionsBox in that case is illustrated in FIG. 19.

<Method 2>

For example, as illustrated in the fifth row from the top of the table illustrated in FIG. 10, a spatial region track group may be linked with an atlas tile group in a single track structure (Method 2).

For example, the link information described above in <Information that links 3D spatial region with atlas tile group> may include information that links a 3D spatial region and an atlas tile group with each other in a single track structure.

The encoding-side device signals such link information. The decoding-side device decodes the 3D spatial region on the basis of the signaled link information. By doing this way, the decoding-side device can extract only an atlas NAL unit constituting a portion corresponding to a 3D spatial region desired to be accessed, in the atlas sub-bitstream. That is, the decoding-side device can decode only a portion of a V-PCC bitstream corresponding to the 3D spatial region by the general-purpose decoder. That is, the decoding-side device can construct only a portion of the point cloud corresponding to the 3D spatial region.

<Method 2-1>

For example, as illustrated in the sixth row from the top of the table illustrated in FIG. 10, groupID may be newly assigned to link (Method 2-1).

For example, information that links the 3D spatial region with the atlas tile group described above in <Method 2> may include information that links the 3D spatial region with group identification information that identifies the atlas tile group to which the atlas NAL unit belongs.

In <Method 1-2>, it has been described that nalm and trif are linked for each sample of the atlas sub-bitstream by using the sample to group function defined in Non Patent Document 2.

Figure 20:
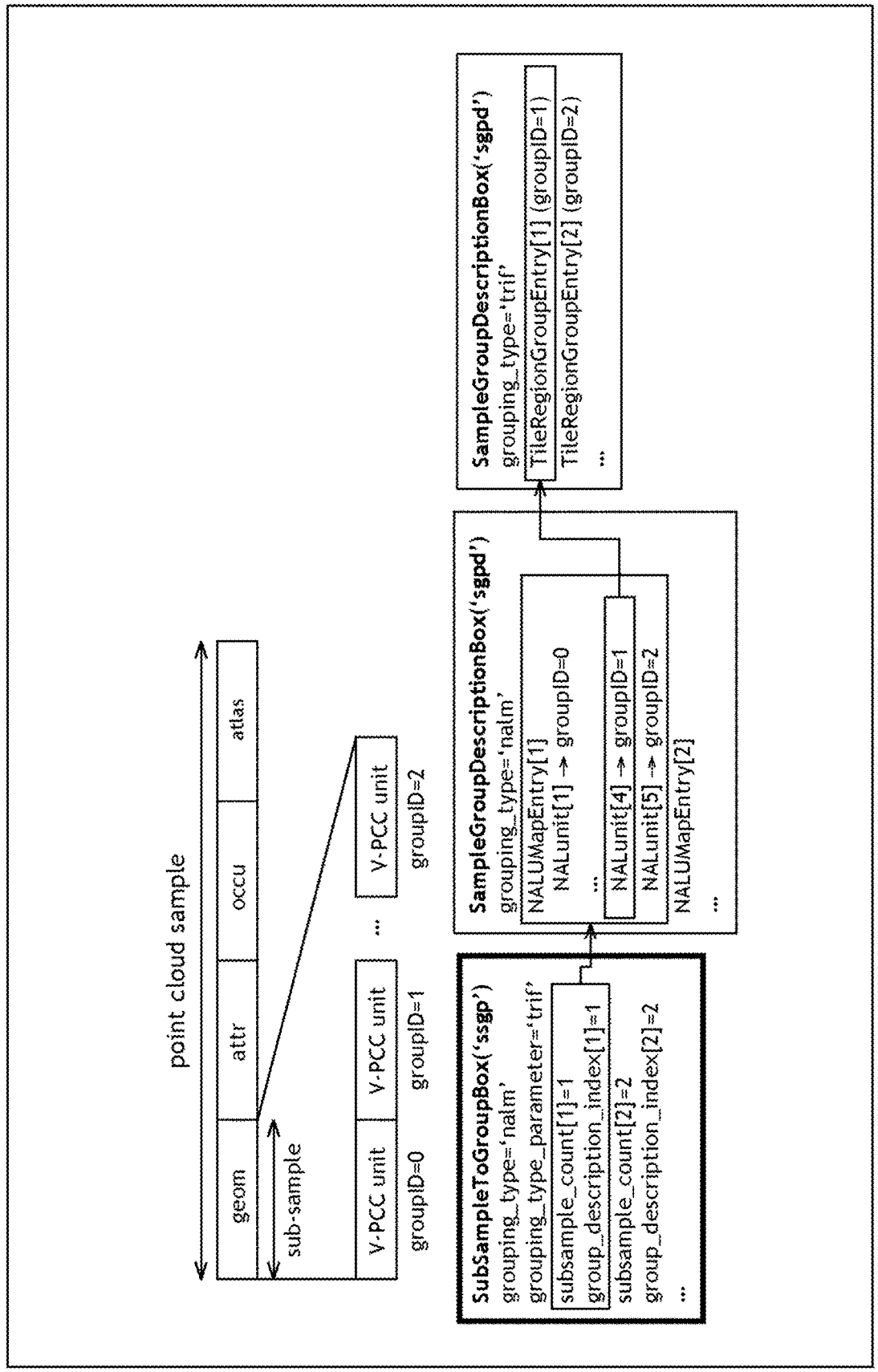
FIG. 20 is a diagram for explaining a link using group identification information in a case of a single track structure.

In a storage single track structure for a V-PCC bitstream (that is, the geometry, the attribute, the occupancy map, and the atlas information) in one track, the sample in Method 1-2 is to be a sub-sample. Therefore, as illustrated in FIG. 20, a new box (SubSampleToGroupBox) is defined so that a mechanism similar to Method 1-3 can be applied to this sub-sample. More specifically, in order to link SampleGroupDescription (nalm, trif) with the sub-sample, sub sample to group is newly defined and replaced with sample to group.

First, VPCCSpatialRegionBox is extended. At that time, the use of the spatial region track group is made optional. That is, syntax similar to that in the example of FIG. 19 (Method 1-3) is used.

Figure 21:
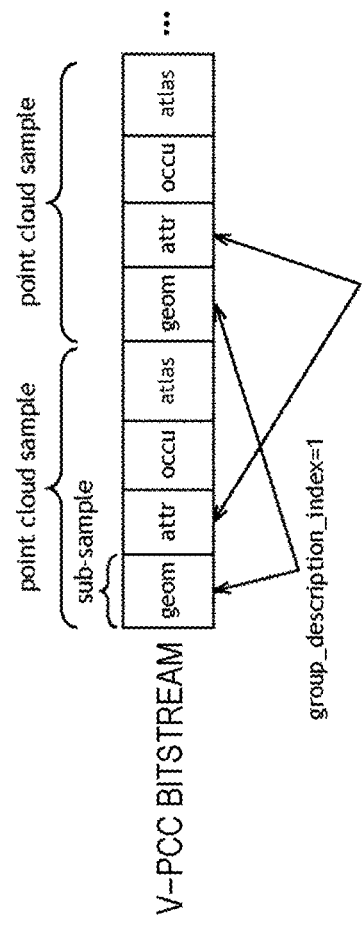
FIG. 21 is a view illustrating an example of SubSampleToGroupBox.

Moreover, as illustrated in FIG. 21, sub sample to group is newly defined. That is, SubSampleToGroupBox having syntax as illustrated in FIG. 21 is signaled. In that case, SubSampleInformationBox is also signaled. Note that, in this SubSampleToGroupBox, sample_count indicates the number of samples having sub-samples.

Furthermore, subsample_count indicates the number of consecutive sub-samples linked with the same sample group descriptor. Semantics of other fields are the same as those of the SubSampleInformationBox.

The encoding-side device signals such link information. The decoding-side device decodes the 3D spatial region on the basis of the signaled link information. By doing this way, the decoding-side device can specify a sub-sample corresponding to a desired 3D spatial region on the basis of the link information.

<Method 2-2>

Figure 22:
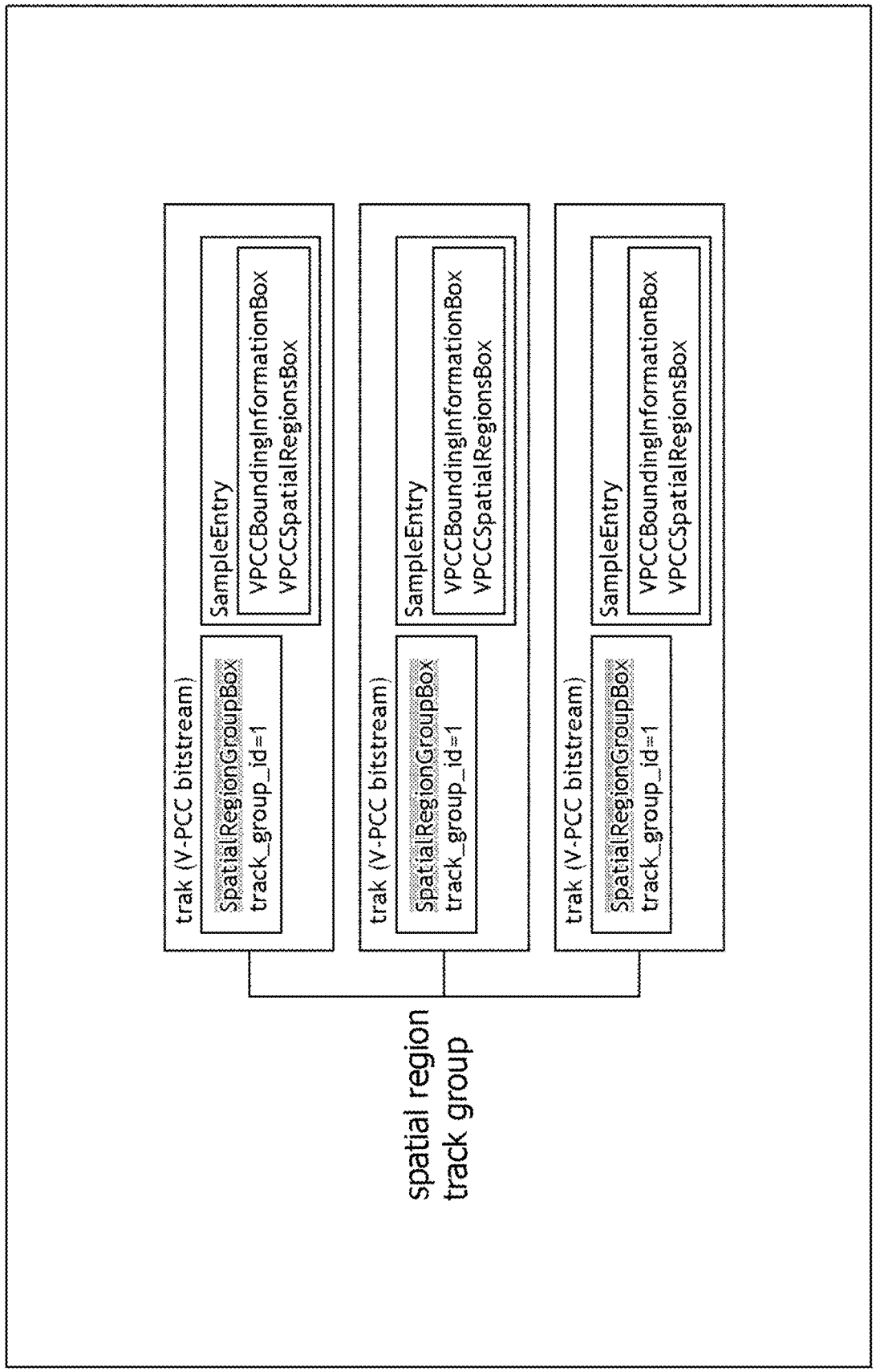
FIG. 22 is a diagram for explaining an example of dividing a V-PCC bitstream for every 3D spatial region.

For example, as illustrated in the seventh row from the top of the table illustrated in FIG. 10, the V-PCC bitstream may be divided for every 3D spatial region (Method 2-2). That is, as illustrated in FIG. 22, individual V-PCC bitstreams divided for every 3D spatial region may be stored in different tracks. Then, the 3D spatial region may be linked with the divided V-PCC bitstream (the track storing the divided V-PCC bitstream) by link information.

For example, the information that links the 3D spatial region with the atlas tile group described above in <Method 2> may include information that links track group identification information that identifies a track that stores a bitstream corresponding to the 3D spatial region with atlas tile group identification information that identifies the atlas tile group.

In this case, individual tracks store the geometry, the attribute, the occupancy map, and the atlas information. 3D spatial region information of each track is signaled in VPCCSpatialRegionsBox. FIG. 23 illustrates an example of syntax of the VPCCSpatialRegionsBox. Since signaling of the 3D spatial region for each track_group_id is unnecessary when used in a single track, control may be performed by flags. Note that, in a case where signaling is performed to the single track, a condition (flags & 1) is to be 1 (true).

The encoding-side device signals such link information. The decoding-side device decodes the 3D spatial region on the basis of the signaled link information. By doing this way, the decoding-side device can specify a track (a divided V-PCC bitstream) corresponding to the desired 3D spatial region on the basis of the link information.

<Method 3>

For example, as illustrated in the eighth row from the top of the table illustrated in FIG. 10, switching display of alternative 3D spatial regions at the same position in a three-dimensional space may be enabled (Method 3).

Figure 24:
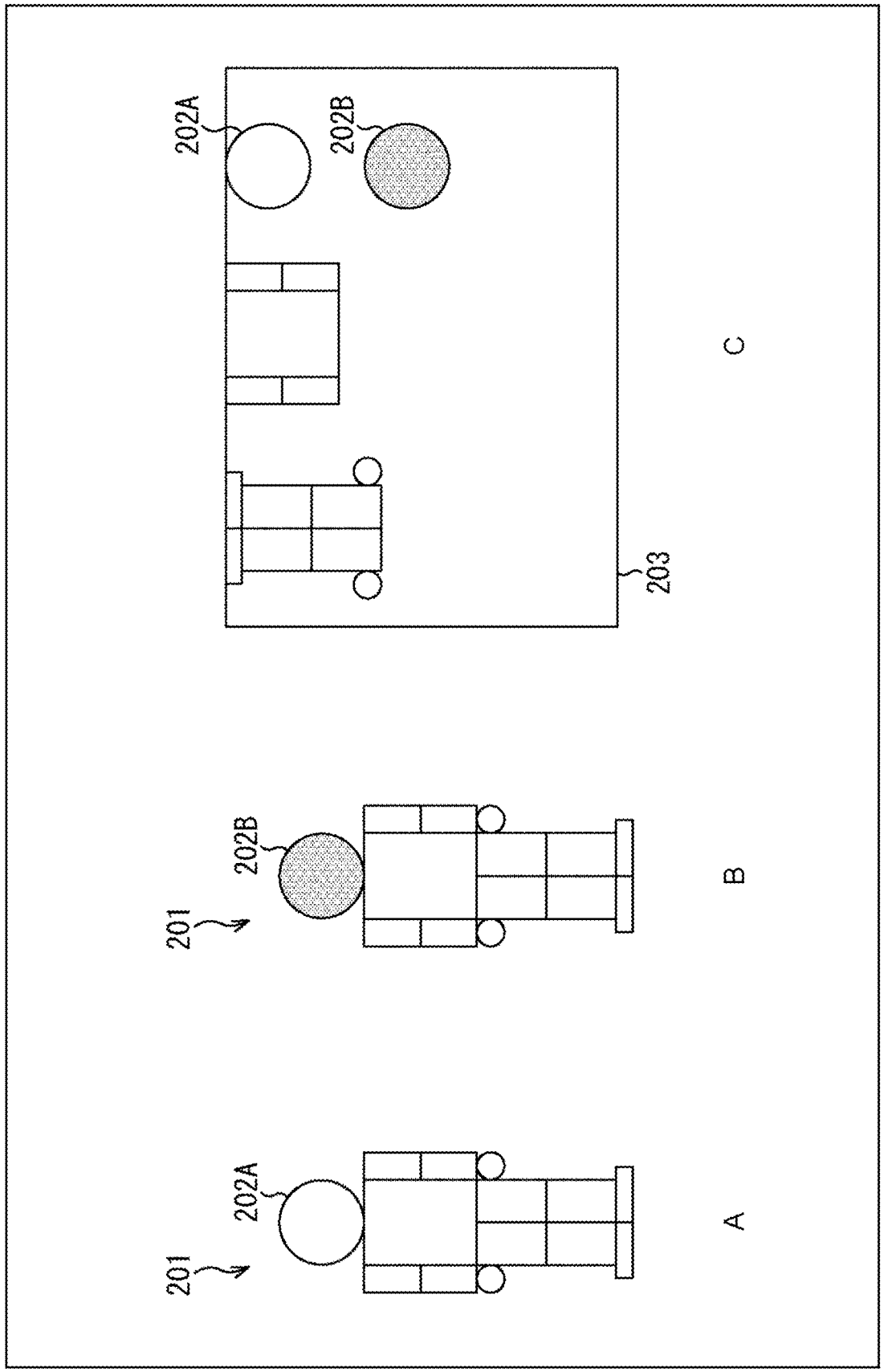
FIG. 24 is a view illustrating an example of switching of 3D spatial regions.

It is possible to implement a use case in which different pieces of partial data are encoded so as to overlap at the same position in a three-dimensional space in an object of one point cloud, and the overlapping partial data is switched according to a situation. For example, as illustrated in A and B of FIG. 24, a head part of an object 201 can be displayed as a head part 202A or a head part 202B. By doing this way, for example, display of the head part can be switched according to a user's preference.

In order to achieve such a function, points overlapping in a three-dimensional space are arranged in different rectangular regions on a 2D image of a video sub-bitstream in one V-PCC bitstream. In the case of the example of FIG. 24, as illustrated in C of FIG. 24, a patch of the head part 202A and a patch of the head part 202B are arranged at mutually different positions in a video frame 203 that is mutually the same.

<Method 3-1>

As described above in <Method 3>, information enabling switching display of alternative 3D spatial regions at the same position in a three-dimensional space may be signaled.

That is, the link information described above in <Information that links 3D spatial region with atlas tile group> may include switching information that is information regarding switching of the 3D spatial region.

For example, as illustrated in FIG. 25, VPCCSpatialRegionsBox is extended, and AlternativeRegionListStruct for the decoding-side device to identify the alternative 3D spatial region is newly defined as switching information.

The switching information may include information regarding a display switching condition. For example, in the AlternativeRegionListStruct illustrated in FIG. 25, information regarding display switching conditions such as list_type, region_type_value, and ref_3d_region_id is signaled.

list_type indicates a switching reference of an alternative region. For example, a value "0" may indicate that switching is performed according to language setting, and a value "1" may indicate that switching is performed according to age setting of the user. Of course, this is an example, and the list_type can take any value. Furthermore, any reference may be indicated by each value.

region_type_value indicates a type for each region. For example, in a case where the list_type is a value indicating that switching is performed according to language setting, a value "0" of the region_type_value may indicate Japanese (jpn), and a value "1" may indicate English (eng). Of course, this is an example, and the region_type_value can take any value. Furthermore, any type may be indicated by each value.

ref_3d_region_id indicates 3d_region_id of alternative region. This value may be statically determined depending on, for example, preset user preference information. For example, if the user desires Japanese, an alternative region of region_type=0 may be selected. Information equivalent to those may be signaled as SEI of V-PCC codec.

Of course, these are examples of information to be signaled, and information other than these may be signaled. Furthermore, in a case of dynamically changing, DynamicRegionSample may be similarly extended.

Furthermore, the alternative 3D spatial region may be switched on the basis of a trigger dynamically provided from the outside. Then, for example, the switching information described above may include information regarding an event that triggers switching.

For example, an event message of moving picture experts group phase—dynamic adaptive streaming over HTTP (MPEG-DASH) may be applied. For example, event identification information (event_id) is signaled to message data [ ], and a content distribution side delivers the event message at a desired timing. When receiving the event message, a client switches display in accordance with event_id.

Furthermore, in scene description, event_id may be linked with a result of some interaction of the user. For example, in MPEG-4 scene description, different pieces of event_id are set in reference URL queries of a plurality of nodes (for example, bitwrappers) that refers to the same V-PCC object, and these nodes are put together in a switch node. Moreover, eventOut of a node of interaction such as a touch sensor (TouchSensor) is linked with exposedField of the switch node. By doing this way, the display may be switched (a function of the scene description is used) in accordance with interaction of the user, by using the function of the scene description.

<Method 4>

Figure 27:
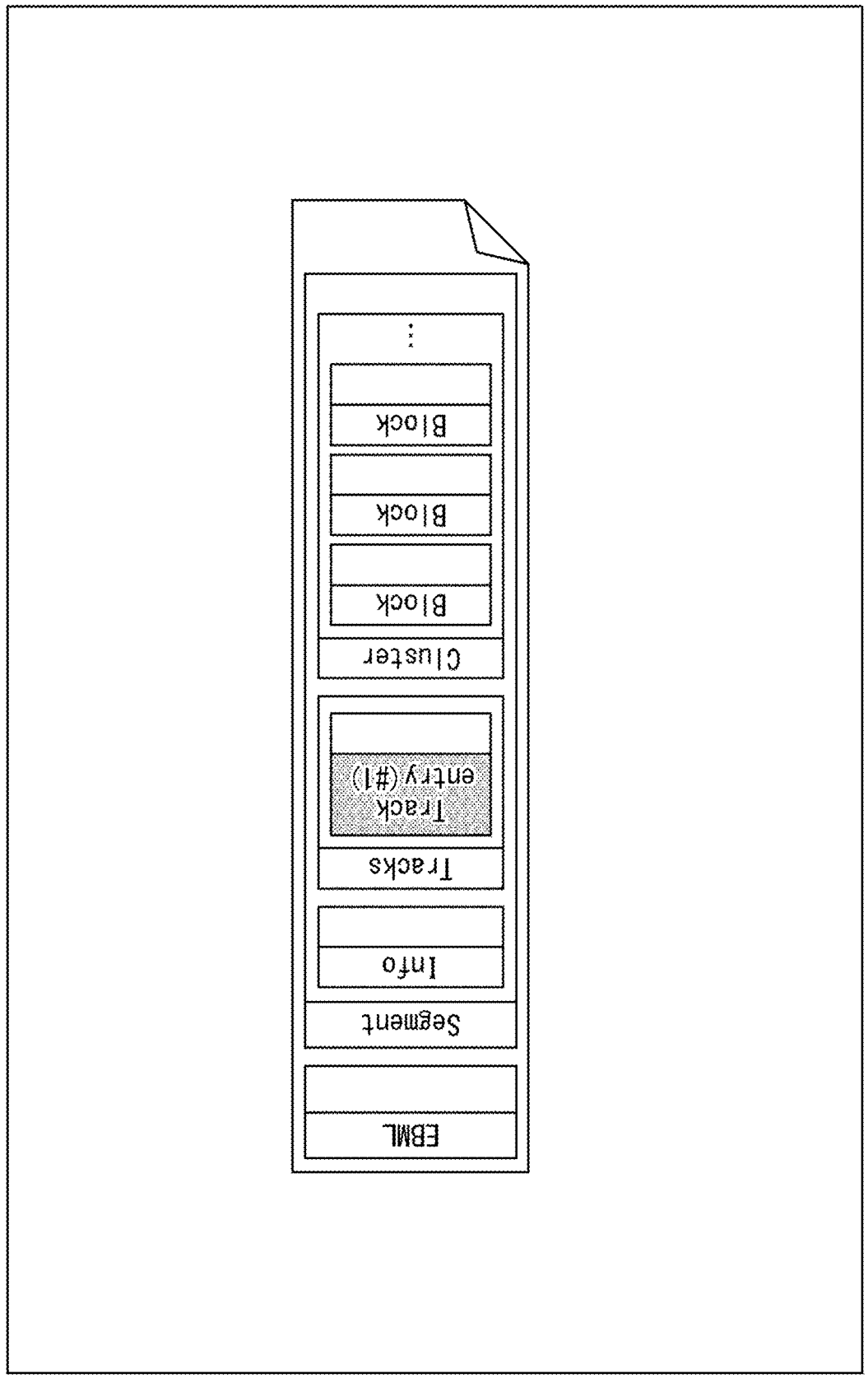
FIG. 27 is a diagram illustrating a configuration example of a Matroska Media Container.

Although the example in which the ISOBMFF is applied as the file format has been described above, any file to store the V-PCC bitstream may be used and a file format other than the ISOBMFF may be adopted. For example, as illustrated in the lowermost row of the table illustrated in FIG. 10, the V-PCC bitstream may be stored in a Matroska Media Container (Method 4). A main configuration example of the Matroska Media Container is illustrated in FIG. 27.

For example, link information of an atlas tile group may be signaled to an element having information equivalent to VPCCSpatialRegionsBox under a track entry element. Furthermore, the information enabling the switching display of the alternative 3D spatial region may be signaled as a newly defined element under the track entry element.

<Combination>

Some or all of Methods 1 to 4 described above can be appropriately combined and applied.

2. First Embodiment

<Encoding Device>

Figure 28:
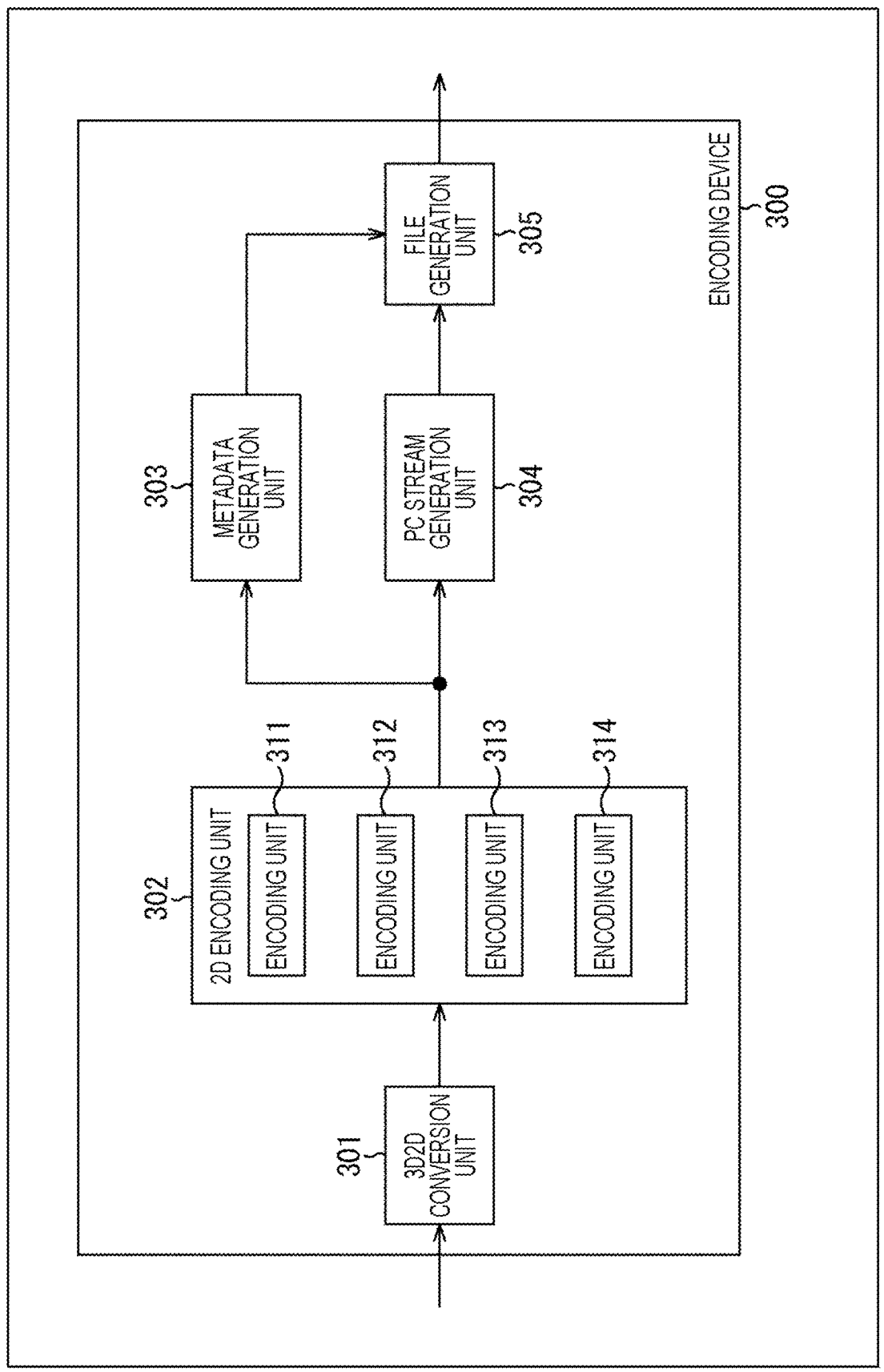
FIG. 28 is a block diagram illustrating a main configuration example of an encoding device.

The encoding-side device will be described. The present technology described in <1. Signaling of link information> can be applied to any device. FIG. 28 is a block diagram illustrating an example of a configuration of an encoding device, which is one mode of an image processing apparatus (an encoding-side device) to which the present technology is applied. An encoding device 300 illustrated in FIG. 28 is a device that applies V-PCC, to encode point cloud data as a video frame by an encoding method for a two-dimensional image. Furthermore, the encoding device 300 stores, in the ISOBMFF, a V-PCC bitstream generated by the encoding.

The encoding device 300 applies the present technology described in <1. Signaling of link information>, and stores information into the ISOBMFF so as to enable partial access. That is, the encoding device 300 signals link information that links a 3D spatial region and an atlas tile group with each other.

Note that, in FIG. 28, main parts of processing units, data flows, and the like are illustrated, and those illustrated in FIG. 28 are not necessarily all. That is, in the encoding device 300, there may be a processing unit not illustrated as a block in FIG. 28, or there may be a flow of processing or data not illustrated as an arrow or the like in FIG. 28.

As illustrated in FIG. 28, the encoding device 300 includes a 3D2D conversion unit 301, a 2D encoding unit 302, a metadata generation unit 303, a PC stream generation unit 304, and a file generation unit 305.

The 3D2D conversion unit 301 decomposes a point cloud, which is 3D data inputted to the encoding device 300, into patches, and performs packing. That is, the 3D2D conversion unit 301 generates a geometry video frame, an attribute video frame, and an occupancy map video frame, and supplies them to the 2D encoding unit 302. Furthermore, the 3D2D conversion unit 301 generates atlas information, and supplies the atlas information to the 2D encoding unit 302.

The 2D encoding unit 302 performs processing related to encoding. For example, the 2D encoding unit 302 acquires the geometry video frame, the attribute video frame, the occupancy map video frame, the atlas information, and the like supplied from the 3D2D conversion unit 301. The 2D encoding unit 302 encodes them to generate a bitstream. The 2D encoding unit 302 supplies the generated bitstream to the metadata generation unit 303 and the PC stream generation unit 304.

The 2D encoding unit 302 includes an encoding unit 311 to an encoding unit 314. The encoding unit 311 encodes a geometry video frame to generate a geometry video sub-bitstream. The 2D encoding unit 302 supplies the generated geometry video sub-bitstream to the metadata generation unit 303 and the PC stream generation unit 304.

The encoding unit 312 encodes an attribute video frame to generate an attribute video sub-bitstream. The encoding unit 312 supplies the generated attribute video sub-bitstream to the metadata generation unit 303 and the PC stream generation unit 304.

The encoding unit 313 encodes an occupancy map video frame to generate an occupancy map video sub-bitstream. The encoding unit 313 supplies the generated occupancy map video sub-bitstream to the metadata generation unit 303 and the PC stream generation unit 304.

The encoding unit 314 encodes atlas information to generate an atlas sub-bitstream. The encoding unit 314 supplies the generated atlas sub-bitstream to the metadata generation unit 303 and the PC stream generation unit 304.

The metadata generation unit 303 performs processing related to generation of metadata. For example, the metadata generation unit 303 acquires the video sub-bitstream and the atlas sub-bitstream supplied from the 2D encoding unit 302. Furthermore, the metadata generation unit 303 generates metadata by using these pieces of data.

For example, the metadata generation unit 303 may generate, as metadata, link information that links a 3D spatial region of a point cloud with an atlas tile group. That is, the metadata generation unit 303 may generate metadata by applying the present technology described in <1. Signaling of link information>. Note that the metadata generation unit 303 can apply any of Method 1, Method 1-1, Method 1-2, Method 1-3, Method 2, Method 2-1, Method 2-2, Method 3, Method 3-1, and Method 4, various modifications, and a combination of multiple methods (hereinafter, referred to as various methods of the present technology), for example, as described above in <1. Signaling of link information>.

As described above, when having generated metadata including the link information that links the 3D spatial region of the point cloud with the atlas tile group, the metadata generation unit 303 supplies the metadata to the file generation unit 305.

The PC stream generation unit 304 performs processing related to generation of the V-PCC bitstream. For example, the PC stream generation unit 304 acquires the video sub-bitstream and the atlas sub-bitstream supplied from the 2D encoding unit 302. Furthermore, by using them, the PC stream generation unit 304 generates a V-PCC bitstream (a geometry video sub-bitstream, an attribute video sub-bitstream, an occupancy map video sub-bitstream, and an atlas sub-bitstream, or a collection of these), and supplies to the file generation unit 305.

The file generation unit 305 performs processing related to file generation. For example, the file generation unit 305 acquires the metadata supplied from the metadata generation unit 303 and including the link information that links the 3D spatial region of the point cloud with the atlas tile group. Furthermore, the file generation unit 305 acquires the V-PCC bitstream supplied from the PC stream generation unit 304. The file generation unit 305 generates a file (for example, the ISOBMFF or the Matroska Media Container) that stores the metadata including the link information and the V-PCC bitstream.

At that time, the file generation unit 305 applies the present technology described in <1. Signaling of link information> to generate a file to signal the link information that links the 3D spatial region of the point cloud with the atlas tile group. Note that the file generation unit 305 can apply any of the various methods of the present technology described above in <1. Signaling of link information>. Then, the file generation unit 305 outputs the generated file to outside the encoding device 300.

Note that these processing units (the 3D2D conversion unit 301 to the file generation unit 305, and the encoding unit 311 to the encoding unit 314) have any configurations. For example, each processing unit may be configured by a logic circuit that implements the above-described processing. Furthermore, each processing unit may have, for example, a central processing unit (CPU), a read only memory (ROM), a random access memory (RAM), and the like, and execute a program by using them to implement the above-described processing. Of course, each processing unit may have both of the configurations, implement a part of the above-described processing by the logic circuit, and implement other by executing the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

As described above, the encoding device 300 applies the present technology described in <1. Signaling of link information>, to signal the link information that links the 3D spatial region with the atlas tile group.

By doing this way, the decoding-side device can extract only an atlas NAL unit constituting a portion corresponding to a 3D spatial region desired to be accessed, in the atlas sub-bitstream. That is, the decoding-side device can decode only a portion corresponding to the desired 3D spatial region in the V-PCC bitstream. That is, the decoding-side device can construct only a portion of the point cloud corresponding to the desired 3D spatial region.

By doing this way, the decoding-side device can link the 3D spatial region with the atlas tile group. Therefore, the decoding-side device can extract the coded tile group NAL unit and the video sub-bitstream necessary for constructing the partial point cloud of the desired 3D spatial region, and input to the general-purpose decoder. Therefore, the decoding-side device can construct and display only the partial point cloud of the desired 3D spatial region.

For example, it is possible to obtain an effect of effectively utilizing a bandwidth to achieve higher definition, by acquiring only a viewing portion of an object of a point cloud at a time of streaming distribution. Such a point cloud object distribution technology is expected to be used for 6DoF content distribution in AR and VR applications.

Furthermore, since the general-purpose decoder can be used, the decoding-side device can suppress an increase in cost as compared with a case of developing a dedicated decoder having a function capable of extracting, from an atlas sub-bitstream, a coded tile group NAL unit necessary for constructing a partial point cloud of a desired 3D spatial region, and decoding.

<Flow of Encoding Process>

Figure 29:
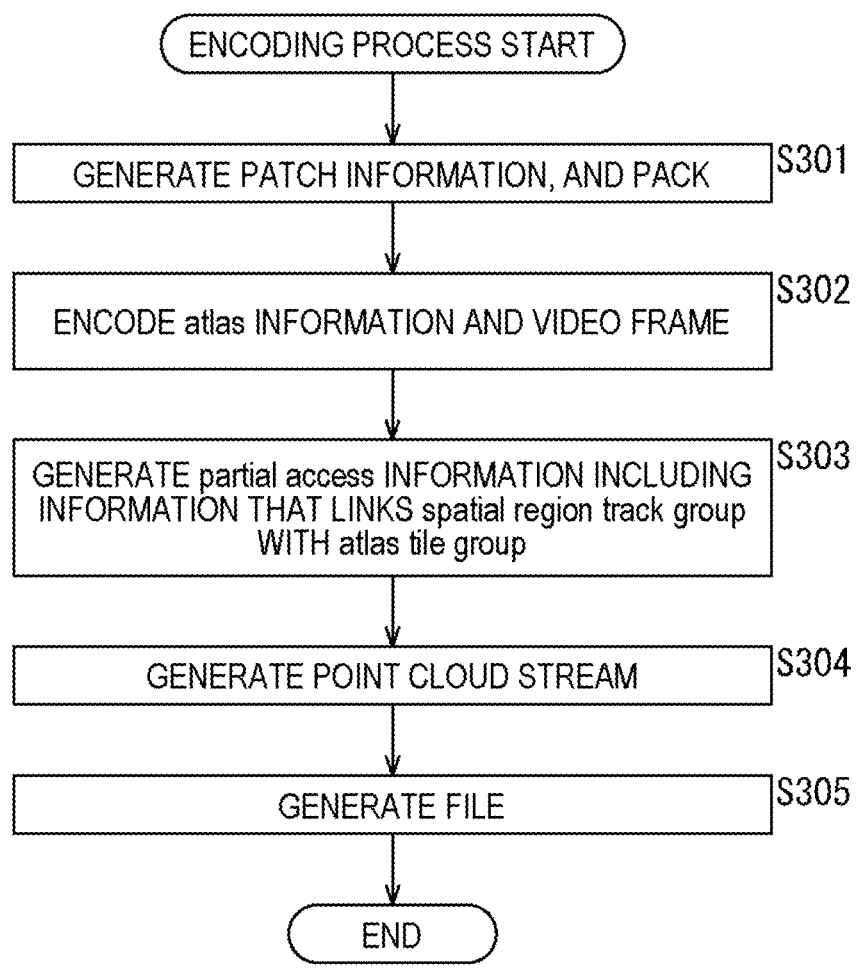
FIG. 29 is a flowchart for explaining an example of a flow of an encoding process.

An example of a flow of an encoding process executed by the encoding device 300 will be described with reference to a flowchart of FIG. 29.

When the encoding process is started, in step S301, the 3D2D conversion unit 301 of the encoding device 300 decomposes a point cloud into patches, to generate patches of a geometry and an attribute. Then, the 3D2D conversion unit 301 packs the patches into a video frame. Furthermore, the 3D2D conversion unit 301 generates an occupancy map and atlas information.

In step S302, the 2D encoding unit 302 encodes a geometry video frame, an attribute video frame, an occupancy map video frame, and atlas information. For example, the encoding unit 311 encodes the geometry video frame by using any encoding method for 2D data (for example, AVC, HEVC, or the like) to generate a geometry video sub-bitstream. Furthermore, the encoding unit 312 encodes the attribute video frame by using any encoding method for 2D data to generate an attribute video sub-bitstream. Furthermore, the encoding unit 313 encodes the occupancy map video frame by using any encoding method for 2D data to generate an occupancy map video sub-bitstream. Furthermore, the encoding unit 314 encodes the atlas information by any encoding method to generate an atlas sub-bitstream.

In step S303, the metadata generation unit 303 generates, as metadata, partial access information including link information that links a spatial region track group and an atlas tile group with each other. That is, the metadata generation unit 303 may generate metadata by applying the present technology described in <1. Signaling of link information>. Note that the metadata generation unit 303 can apply any of the various methods of the present technology described above in <1. Signaling of link information>, for example.

In step S304, the PC stream generation unit 304 generates a V-PCC bitstream (a point cloud stream) by using the video sub-bitstream.

In step S305, the file generation unit 305 generates a file (for example, the ISOBMFF or the Matroska Media Container) that stores the V-PCC bitstream and the metadata including the link information that links the 3D spatial region of the point cloud with the atlas tile group.

At that time, the file generation unit 305 applies the present technology described in <1. Signaling of link information>. That is, the file generation unit 305 generates a file to signal link information as described above in <1. Signaling of link information>. Note that the file generation unit 305 can apply any of the various methods of the present technology described above in <1. Signaling of link information>.

When the processing in step S305 ends, the encoding process ends.

As described above, in the encoding process, the encoding device 300 applies the present technology described in <1. Signaling of link information>, to signal the link information that links the 3D spatial region with the atlas tile group.

By doing this way, the decoding-side device can extract only an atlas NAL unit constituting a portion corresponding to a 3D spatial region desired to be accessed, in the atlas sub-bitstream. That is, the decoding-side device can decode only portions of the video sub-bitstream and the atlas sub-bitstream corresponding to the 3D spatial region by the general-purpose decoder. That is, the decoding-side device can construct only a portion of the point cloud corresponding to the 3D spatial region.

By doing this way, the decoding-side device can link the 3D spatial region with the atlas tile group. Therefore, the decoding-side device can extract the coded tile group NAL unit and the video sub-bitstream necessary for constructing the partial point cloud of the desired 3D spatial region, and input to the general-purpose decoder. Therefore, the decoding-side device can construct and display only the partial point cloud of the desired 3D spatial region.

For example, it is possible to obtain an effect of effectively utilizing a bandwidth to achieve higher definition, by acquiring only a viewing portion of an object of a point cloud at a time of streaming distribution. Such a point cloud object distribution technology is expected to be used for 6DoF content distribution in AR and VR applications.

Furthermore, since the general-purpose decoder can be used, the decoding-side device can suppress an increase in cost as compared with a case of developing a dedicated decoder having a function capable of extracting, from an atlas sub-bitstream, a coded tile group NAL unit necessary for constructing a partial point cloud of a desired 3D spatial region, and decoding.

3. Second Embodiment

<Decoding Device>

Figure 30:
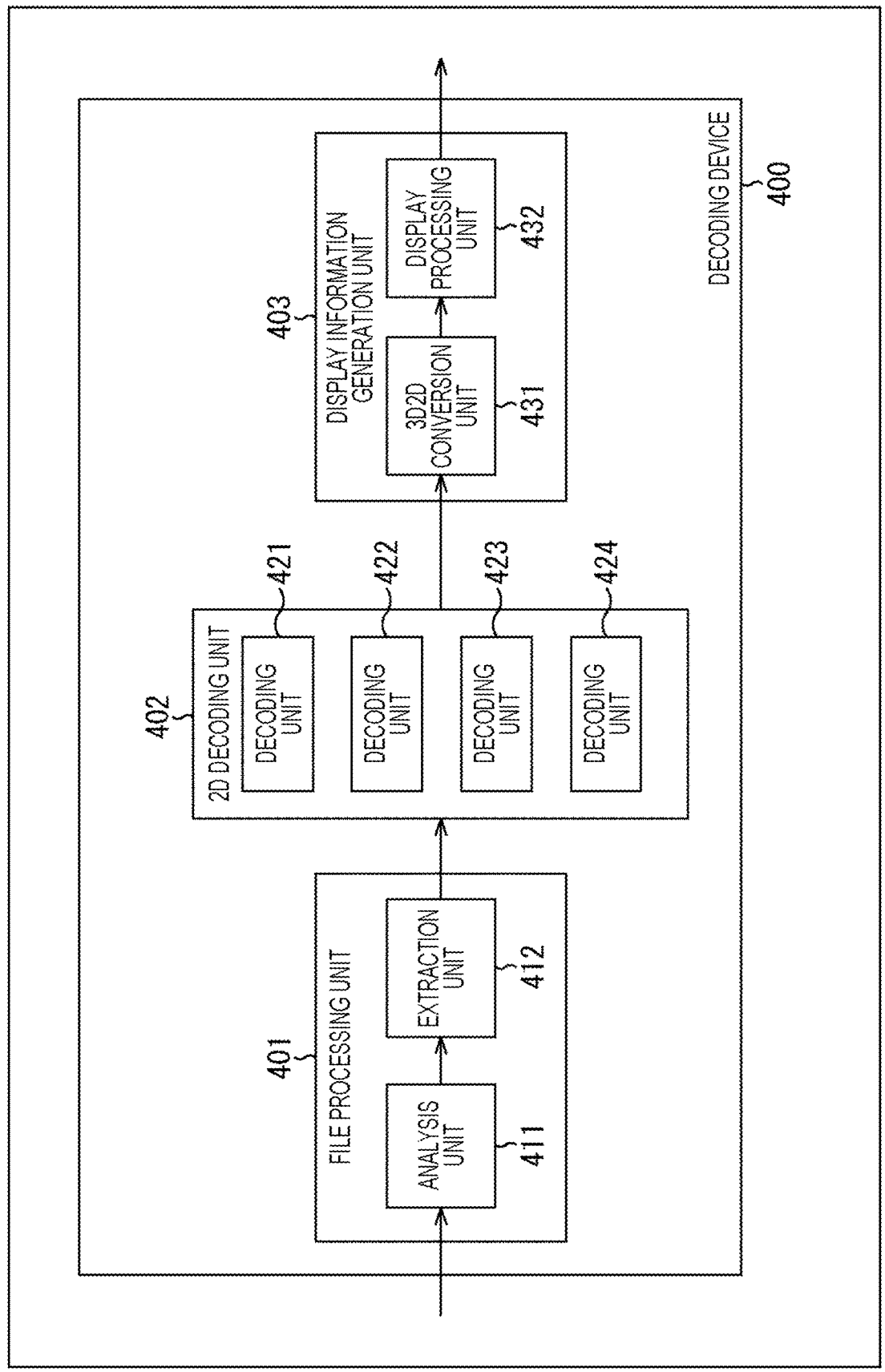
FIG. 30 is a block diagram illustrating a main configuration example of a decoding device.

The present technology described in <1. Signaling of link information> can be applied not only to the encoding-side device but also to a decoding-side device. FIG. 30 is a block diagram illustrating an example of a configuration of a decoding device, which is one mode of an image processing apparatus to which the present technology is applied. A decoding device 400 illustrated in FIG. 30 is a device that applies V-PCC, acquires, from a file, a V-PCC bitstream (a geometry video sub-bitstream, an attribute video sub-bitstream, an occupancy map video sub-bitstream, and an atlas sub-bitstream, or a collection of these) encoded by an encoding method for a two-dimensional image with point cloud data as a video frame, and decodes the V-PCC bitstream by a decoding method for a two-dimensional image to generate (reconstruct) a point cloud. For example, the decoding device 400 can extract the V-PCC bitstream from a file generated by the encoding device 300, and decode the V-PCC bitstream to generate a point cloud.

At that time, the decoding device 400 applies the present technology described in <1. Signaling of link information> to implement partial access. That is, on the basis of signaled link information that links a 3D spatial region with an atlas tile group, the decoding device 400 can decode only a V-PCC bitstream corresponding to the 3D spatial region (that is, a desired 3D spatial region) corresponding to a desired three-dimensional space region, to construct a partial point cloud.

Note that, in FIG. 30, main parts of processing units, data flows, and the like are illustrated, and those illustrated in FIG. 30 are not necessarily all. That is, in the decoding device 400, there may be a processing unit not illustrated as a block in FIG. 30, or there may be a flow of processing or data not illustrated as an arrow or the like in FIG. 30.

As illustrated in FIG. 30, the decoding device 400 includes a file processing unit 401, a 2D decoding unit 402, and a display information generation unit 403.

The file processing unit 401 extracts a V-PCC bitstream from a file inputted to the decoding device 400, and supplies to the 2D decoding unit 402. At that time, the file processing unit 401 applies the present technology described in <1. Signaling of link information>, and extract a V-PCC bitstream corresponding to a 3D spatial region (that is, a desired 3D spatial region) corresponding to a desired three-dimensional space region on the basis of signaled link information that links a 3D spatial region with an atlas tile group. Note that the file processing unit 401 can apply any of the various methods of the present technology described above in <1. Signaling of link information>. Then, the file processing unit 401 supplies the extracted V-PCC bitstream to the 2D decoding unit 402.

That is, only the extracted V-PCC bitstream is to be a decoding target. In other words, on the basis of the signaled link information, the file processing unit 401 excludes a V-PCC bitstream unnecessary for reconfiguring a point cloud of the desired 3D spatial region, from the decoding target.

The file processing unit 401 includes an analysis unit 411 and an extraction unit 412.

The analysis unit 411 performs processing related to analysis of a file (for example, the ISOBMFF or the like) inputted to the decoding device 400. For example, the file processing unit 401 analyzes the file by applying the present technology described in <1. Signaling of link information>, and select a spatial region track group and an atlas tile group that correspond to a desired three-dimensional space, on the basis of link information that links a 3D spatial region of a point cloud and the atlas tile group with each other. Note that the analysis unit 411 can apply any of the various methods of the present technology described above in <1. Signaling of link information>.

That is, the analysis unit 411 selects a 3D spatial region and an atlas tile group that correspond to a desired three-dimensional space, on the basis of link information that is stored in a file together with a bitstream of a point cloud expressing an object having a three-dimensional shape as a set of points and that links the 3D spatial region of the point cloud with the atlas tile group.

Then, the analysis unit 411 supplies information indicating the selected spatial region track group and atlas tile group, to the extraction unit 412.

The extraction unit 412 extracts data to be the decoding target from the V-PCC bitstream on the basis of an analysis result by the analysis unit 411. That is, the extraction unit 412 extracts an atlas NAL unit corresponding to the atlas tile group selected by the analysis unit 411, from the file.

Furthermore, the extraction unit 412 extracts a video sub-bitstream corresponding to the spatial region track group selected by the analysis unit 411, from the file. The extraction unit 412 supplies the extracted data to the 2D decoding unit 402.

The 2D decoding unit 402 performs processing related to decoding. For example, the 2D decoding unit 402 acquires a geometry video sub-bitstream, an attribute video sub-bitstream, an occupancy map video sub-bitstream, an atlas sub-bitstream, and the like supplied from the file processing unit 401. The 2D decoding unit 402 decodes them to generate a video frame and atlas information. The 2D decoding unit 402 supplies the generated bitstream to the metadata generation unit 303 and the PC stream generation unit 304.

The 2D decoding unit 402 includes a decoding unit 421 to a decoding unit 424. The decoding unit 421 decodes the supplied geometry video sub-bitstream to generate a geometry video frame (2D data). The decoding unit 421 supplies the generated geometry video frame to the display information generation unit 403.

The decoding unit 422 decodes the attribute video sub-bitstream to generate an attribute video frame (2D data). The decoding unit 422 supplies the generated attribute video frame to the display information generation unit 403.

The decoding unit 423 decodes the occupancy map video sub-bitstream to generate an occupancy map video frame (2D data). The decoding unit 423 supplies the generated occupancy map video frame to the display information generation unit 403.

The decoding unit 424 decodes the atlas sub-bitstream (the extracted atlas NAL unit), to generate atlas information corresponding to the video frame described above. The decoding unit 424 supplies the generated atlas information to the display information generation unit 403.

The display information generation unit 403 performs processing related to construction and rendering of a point cloud. For example, the display information generation unit 403 acquires a video frame and atlas information supplied from the 2D decoding unit 402. Furthermore, the display information generation unit 403 generates a point cloud from patches packed into the acquired video frame, on the basis of the acquired atlas information. Then, the display information generation unit 403 renders the point cloud, generates a display image, and outputs the display image to outside the decoding device 400.

The display information generation unit 403 includes, for example, a 2D3D conversion unit 431 and a display processing unit 433.

The 2D3D conversion unit 431 converts a patch (2D data) arranged in a video frame supplied from the 2D decoding unit 402 into a point cloud (3D data). The 2D3D conversion unit 431 supplies the generated point cloud to the display processing unit 432.

The display processing unit 432 performs processing related to rendering. For example, the display processing unit 432 acquires a point cloud supplied from the 2D3D conversion unit 431. Furthermore, the display processing unit 432 renders the acquired point cloud to generate a display image. The display processing unit 432 outputs the generated display image to outside the decoding device 400 (for example, a monitor or the like).

As described above, the decoding device 400 applies the present technology described in <1. Signaling of link information>, and performs partial access on the basis of signaled link information that links a 3D spatial region with an atlas tile group.

By doing this way, the decoding device 400 can extract only an atlas NAL unit constituting a portion corresponding to the 3D spatial region desired to be accessed, in the atlas sub-bitstream. That is, the decoding device 400 can decode only a portion corresponding to the desired 3D spatial region in the V-PCC bitstream. That is, the decoding device 400 can construct only a portion of the point cloud corresponding to the desired 3D spatial region.

By doing this way, the decoding device 400 can link the 3D spatial region with the atlas tile group. Therefore, the decoding device 400 can extract the coded tile group NAL unit and the video sub-bitstream necessary for constructing the partial point cloud of the desired 3D spatial region, and input to the general-purpose decoder. Therefore, the decoding device 400 can construct and display only the partial point cloud of the desired 3D spatial region.

For example, it is possible to obtain an effect of effectively utilizing a bandwidth to achieve higher definition, by acquiring only a viewing portion of an object of a point cloud at a time of streaming distribution. Such a point cloud object distribution technology is expected to be used for 6DoF content distribution in AR and VR applications.

Furthermore, since the general-purpose decoder can be used, the decoding device 400 can suppress an increase in cost as compared with a case of developing a dedicated decoder having a function capable of extracting, from an atlas sub-bitstream, a coded tile group NAL unit necessary for constructing a partial point cloud of a desired 3D spatial region, and decoding.

<Flow of Decoding Process>

Figure 31:
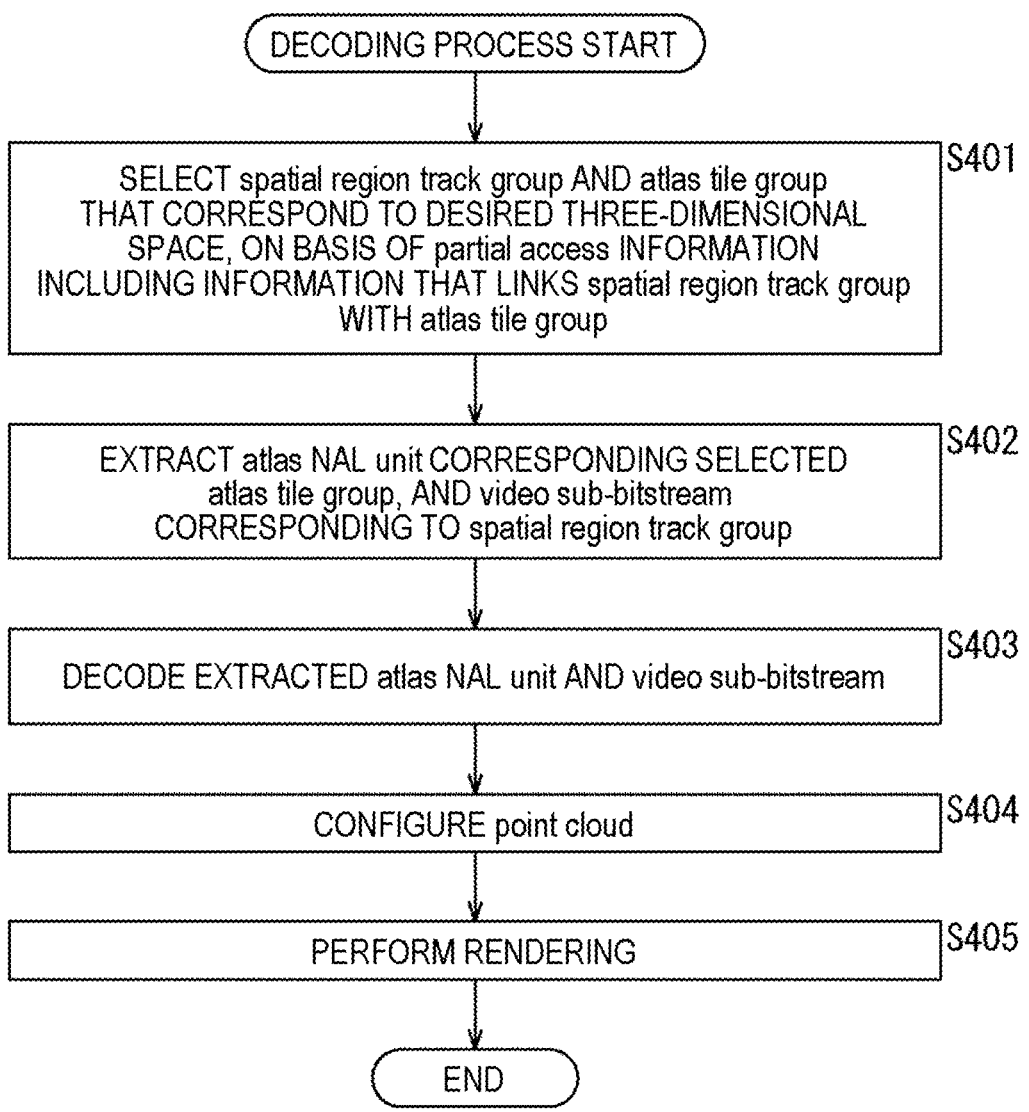
FIG. 31 is a flowchart for explaining an example of a flow of a decoding process.
Figure 32:
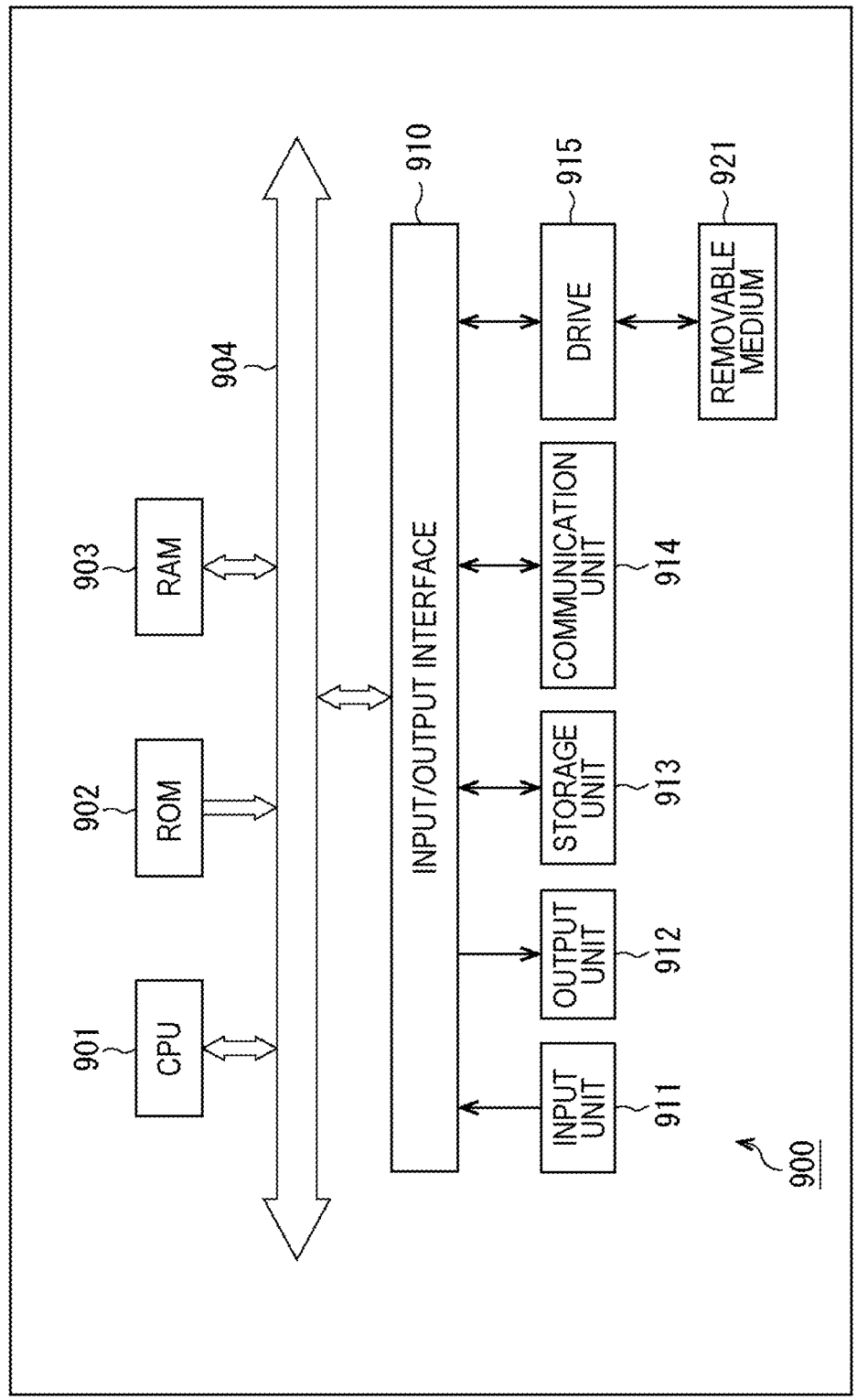
FIG. 32 is a block diagram illustrating a main configuration example of a computer.

An example of a flow of a decoding process executed by this decoding device 400 will be described with reference to a flowchart of FIG. 31.

When the decoding process is started, in step S401, the analysis unit 411 of the decoding device 400 selects a spatial region track group and an atlas tile group that correspond to a desired three-dimensional space, on the basis of partial access information including information that links the spatial region track group and the atlas tile group with each other.

In step S402, the extraction unit 412 extracts an atlas NAL unit corresponding to the atlas tile group selected in step S401 and a video sub-bitstream corresponding to the spatial region track group.

In step S403, the 2D decoding unit 402 decodes the atlas NAL unit and the video sub-bitstream extracted in step S402.

In step S404, the 2D3D conversion unit 431 constructs a point cloud by using a video frame and atlas information generated by the processing in step S403. That is, the 2D3D conversion unit 431 constructs a partial point cloud corresponding to the desired three-dimensional space.

In step S405, the display processing unit 432 renders the point cloud (that is, the partial point cloud corresponding to the desired three-dimensional space) generated in the processing in step S404, to generate a display image. That is, the display processing unit 432 generates a display image corresponding to the desired three-dimensional space.

When the processing in step S405 ends, the decoding process ends.

As described above, in the decoding process, the decoding device 400 can construct a partial point cloud corresponding to the desired 3D spatial region on the basis of signaled link information that links a 3D spatial region with an atlas tile group, by applying the present technology described in <1. Signaling of link information>.

For example, it is possible to obtain an effect of effectively utilizing a bandwidth to achieve higher definition, by acquiring only a viewing portion of an object of a point cloud at a time of streaming distribution. Such a point cloud object distribution technology is expected to be used for 6DoF content distribution in AR and VR applications.

Furthermore, since the general-purpose decoder can be used, the decoding device 400 can suppress an increase in cost as compared with a case of developing a dedicated decoder having a function capable of extracting, from an atlas sub-bitstream, a coded tile group NAL unit necessary for constructing a partial point cloud of a desired 3D spatial region, and decoding.

4. Supplementary Note

<Computer>

The series of processes described above can be executed by hardware or also executed by software. When the series of processes are performed by software, a program that configures the software is installed in a computer. Here, examples of the computer include, for example, a computer that is built in dedicated hardware, a general-purpose personal computer that can perform various functions by being installed with various programs, and the like.

FIG. 27 is a block diagram illustrating a configuration example of hardware of a computer that executes the series of processes described above in accordance with a program.

In a computer 900 illustrated in FIG. 27, a central processing unit (CPU) 901, a read only memory (ROM) 902, and a random access memory (RAM) 903 are mutually connected via a bus 904.

The bus 904 is further connected with an input/output interface 910. To the input/output interface 910, an input unit 911, an output unit 912, a storage unit 913, a communication unit 914, and a drive 915 are connected.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface or the like. The drive 915 drives a removable medium 921 such as a magnetic disk, an optical disk, a magneto-optical disk, or a semiconductor memory.

In the computer configured as described above, the series of processes described above are performed, for example, by the CPU 901 loading a program recorded in the storage unit 913 into the RAM 903 via the input/output interface 910 and the bus 904, and executing. The RAM 903 also appropriately stores data necessary for the CPU 901 to execute various processes, for example.

The program executed by the computer can be applied by being recorded on, for example, the removable medium 921 as a package medium or the like. In this case, by attaching the removable medium 921 to the drive 915, the program can be installed in the storage unit 913 via the input/output interface 910.

Furthermore, this program can also be provided via a wired or wireless transmission medium such as a local area network, the Internet, or digital satellite broadcasting. In this case, the program can be received by the communication unit 914 and installed in the storage unit 913.

Besides, the program can be installed in advance in the ROM 902 and the storage unit 913.

<Applicable Target of Present Technology>

The case where the present technology is applied to encoding and decoding of point cloud data has been described above, but the present technology can be applied to encoding and decoding of 3D data of any standard without limiting to these examples. That is, as long as there is no contradiction with the present technology described above, any specifications may be adopted for various types of processing such as an encoding and decoding method and various types of data such as 3D data and metadata. Furthermore, as long as there is no contradiction with the present technology, some processes and specifications described above may be omitted.

Furthermore, in the above description, the encoding device 300 and the decoding device 400 have been described as application examples of the present technology, but the present technology can be applied to any configuration.

For example, the present technology may be applied to various electronic devices such as a transmitter or a receiver (for example, a television receiver or a mobile phone) in satellite broadcasting, cable broadcasting such as cable TV, distribution on the Internet, and distribution to a terminal by cellular communication, or a device (for example, a hard disk recorder or a camera) that records an image on a medium such as an optical disk, a magnetic disk, or a flash memory, or reproduces an image from these storage media.

Furthermore, for example, the present technology can also be implemented as a partial configuration of a device such as: a processor (for example, a video processor) as a system large scale integration (LSI) or the like; a module (for example, a video module) using a plurality of processors or the like; a unit (for example, a video unit) using a plurality of modules or the like; or a set (for example, a video set) in which other functions are further added to the unit.

Furthermore, for example, the present technology can also be applied to a network system including a plurality of devices. For example, the present technology may be implemented as cloud computing that performs processing in sharing and in cooperation by a plurality of devices via a network. For example, for any terminal such as a computer, an audio visual (AV) device, a portable information processing terminal, or an Internet of Things (IoT) device, the present technology may be implemented in a cloud service that provides a service related to an image (moving image).

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

<Field and Application to which Present Technology is Applicable>

A system, a device, a processing unit, and the like to which the present technology is applied can be utilized in any field such as, for example, transportation, medical care, crime prevention, agriculture, livestock industry, mining industry, beauty care, factory, household electric appliance, weather, natural monitoring, and the like. Furthermore, any application thereof may be adopted.

For example, the present technology can be applied to a system or a device used for providing contents for viewing, and the like. Furthermore, for example, the present technology can also be applied to a system and a device used for transportation, such as traffic condition supervision and automatic driving control. Moreover, for example, the present technology can also be applied to a system and a device used for security. Furthermore, for example, the present technology can be applied to a system and a device used for automatic control of a machine or the like. Moreover, for example, the present technology can also be applied to system and a device used for agriculture and livestock industry. Furthermore, the present technology can also be applied to a system and a device that monitor natural states such as, for example, volcanoes, forests, and oceans, wildlife, and the like. Moreover, for example, the present technology can also be applied to system and a device used for sports.

<Others>

Note that, in this specification, "flag" is information for identifying a plurality of states, and includes not only information to be used for identifying two states of true (1) or false (0), but also information that enables identification of three or more states. Therefore, a value that can be taken by the "flag" may be, for example, a binary value of 1/0, or may be a ternary value or more. That is, the number of bits included in the "flag" can take any number, and may be 1 bit or a plurality of bits. Furthermore, for the identification information (including the flag), in addition to a form in which the identification information is included in a bitstream, a form is assumed in which difference information of the identification information with respect to a certain reference information is included in the bitstream. Therefore, in this specification, the "flag" and the "identification information" include not only the information thereof but also the difference information with respect to the reference information.

Furthermore, various kinds of information (such as metadata) related to coded data (a bitstream) may be transmitted or recorded in any form as long as it is associated with the coded data. Here, the term "associating" means, when processing one data, allowing other data to be used (to be linked), for example. That is, the data associated with each other may be combined as one data or may be individual data. For example, information associated with coded data (an image) may be transmitted on a transmission line different from the coded data (the image). Furthermore, for example, information associated with the coded data (the image) may be recorded on a recording medium different from the coded data (the image) (or another recording region of the same recording medium). Note that this "association" may be for a part of the data, rather than the entire data. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", "insert", and the like mean, for example, to combine a plurality of objects into one, such as to combine coded data and metadata into one data, and mean one method of "associating" described above.

Furthermore, the embodiments of the present technology are not limited to the above-described embodiments, and various modifications can be made without departing from the scope of the present technology.

For example, a configuration described as one device (or processing unit) may be divided and configured as a plurality of devices (or processing units). On the contrary, a configuration described above as a plurality of devices (or processing units) may be collectively configured as one device (or processing unit). Furthermore, as a matter of course, a configuration other than the above may be added to a configuration of each device (or each processing unit). Moreover, as long as a configuration and an operation of the entire system are substantially the same, a part of a configuration of one device (or processing unit) may be included in a configuration of another device (or another processing unit).

Furthermore, for example, the above-described program may be executed in any device. In that case, the device is only required to have a necessary function (a functional block or the like) such that necessary information can be obtained.

Furthermore, for example, each step of one flowchart may be executed by one device, or may be shared and executed by a plurality of devices. Moreover, when one step includes a plurality of processes, the plurality of processes may be executed by one device or may be shared and executed by a plurality of devices. In other words, a plurality of processes included in one step can be executed as a plurality of steps. On the contrary, a process described as a plurality of steps can be collectively executed as one step.

Furthermore, for example, in a program executed by the computer, processing of steps describing the program may be executed in chronological order in the order described in this specification, or may be executed in parallel or individually at a required timing such as when a call is made. That is, as long as no contradiction occurs, processing of each step may be executed in an order different from the order described above. Moreover, this processing of steps describing program may be executed in parallel with processing of another program, or may be executed in combination with processing of another program.

Furthermore, for example, a plurality of techniques related to the present technology can be implemented independently as a single body as long as there is no contradiction. Of course, any of the plurality of present technologies can be used in combination. For example, a part or all of the present technology described in any embodiment can be implemented in combination with a part or all of the present technology described in another embodiment. Furthermore, a part or all of the present technology described above may be implemented in combination with another technology not described above.

Note that the present technology can also have the following configurations.

(1) An image processing apparatus including:
a selection unit configured to select a 3D spatial region and an atlas tile group that correspond to a desired three-dimensional space, on the basis of link information that is stored in a file together with a bitstream of a point cloud expressing an object having a three-dimensional shape as a set of points, the link information linking the 3D spatial region of the point cloud with the atlas tile group;
an extraction unit configured to extract, from the file, an atlas NAL unit corresponding to the atlas tile group selected by the selection unit, and extract a bitstream corresponding to the 3D spatial region selected by the selection unit; and
a decoding unit configured to decode the bitstream extracted by the extraction unit to generate 2D data corresponding to the 3D spatial region of the desired three-dimensional space, and decode the atlas NAL unit extracted by the extraction unit to generate atlas information corresponding to the 2D data.

(2) The image processing apparatus according to (1), in which
the link information includes information that links the atlas tile group with a spatial region track group that is a group of tracks to store bitstreams corresponding to the 3D spatial region that is mutually same, in a multi-track structure.

(3) The image processing apparatus according to (2), in which
information that links the spatial region track group with the atlas tile group includes information that links track group identification information with group identification information, the track group identification information identifying a track that stores the bitstream, the group identification information identifying the atlas tile group to which the atlas NAL unit belongs.

(4) The image processing apparatus according to (3), in which
the file is a file of an international organization for standardization base media file format (ISOBMFF), and
information that links the track group identification information with the group identification information links the track group identification information with the group identification information by using VPCCSpatialRegionsBox of the ISOBMFF.

(5) The image processing apparatus according to (3) or (4), in which
the file is a file of an international organization for standardization base media file format (ISOBMFF), and
the group identification information links the atlas NAL unit and the atlas tile group by using NALUMapEntry of the ISOBMFF.

(6) The image processing apparatus according to (5), in which
the group identification information links the atlas NAL unit and the atlas tile group for each sample by using SampleToGroupBox of the ISOBMFF.

(7) The image processing apparatus according to any one of (2) to (6), in which
information that links the spatial region track group with the atlas tile group includes information that links track group identification information with atlas tile group identification information, the track group identification information identifying a track that stores the bitstream, the atlas tile group identification information identifying the atlas tile group.

(8) The image processing apparatus according to (7), in which
the file is a file of an international organization for standardization base media file format (ISOBMFF), and
information that links the track group identification information with the atlas tile group identification information links the track group identification information with the atlas tile group identification information by using VPCCSpatialRegionsBox of the ISOBMFF.

(9) The image processing apparatus according to (7) or (8), in which
the file is a file of an international organization for standardization base media file format (ISOBMFF), and
information that links the track group identification information with the atlas tile group identification information links the track group identification information with the atlas tile group identification information by using SpatialRegionGroupBox of the ISOBMFF.

(10) The image processing apparatus according to any one of (2) to (9), in which
information that links the spatial region track group with the atlas tile group includes information that links the spatial region track group with the atlas tile group by using division information of the 3D spatial region.

(11) The image processing apparatus according to any one of (2) to (10), in which
information that links the spatial region track group with the atlas tile group includes information that links the atlas tile group with the bitstream corresponding to a tile of high efficiency video coding (HEVC) at a same position as the atlas tile group.

(12) The image processing apparatus according to any one of (1) to (11), in which
the link information includes information that links the 3D spatial region with the atlas tile group in a single track structure.

(13) The image processing apparatus according to (12), in which
information that links the 3D spatial region with the atlas tile group includes information that links the 3D spatial region with group identification information that identifies the atlas tile group to which the atlas NAL unit belongs.

(14) The image processing apparatus according to (12) or (13), in which
information that links the 3D spatial region with the atlas tile group includes information that links track group identification information with atlas tile group identification information, the track group identification information identifying a track that stores a bitstream corresponding to the 3D spatial region, the atlas tile group identification information identifying the atlas tile group.

(15) The image processing apparatus according to any one of (1) to (14), in which
the link information includes switching information that is information regarding switching of the 3D spatial region.

(16) The image processing apparatus according to (15), in which
the switching information includes information regarding a condition of the switching.

(17) The image processing apparatus according to (15) or (16), in which
the switching information includes information regarding an event that triggers the switching.

(18) An image processing method including:
selecting a 3D spatial region and an atlas tile group that correspond to a desired three-dimensional space, on the basis of link information that is stored in a file together with a bitstream of a point cloud expressing an object having a three-dimensional shape as a set of points, the link information linking the 3D spatial region of the point cloud with the atlas tile group;
extracting, from the file, an atlas NAL unit corresponding to the selected atlas tile group, and extracting a bitstream corresponding to the selected 3D spatial region; and
decoding the extracted bitstream to generate 2D data corresponding to the 3D spatial region of the desired three-dimensional space, and decoding the extracted atlas NAL unit to generate atlas information corresponding to the 2D data.

(19) An image processing apparatus including:
an encoding unit configured to encode 2D data to generate a bitstream, the 2D data corresponding to a 3D spatial region of a point cloud expressing an object having a three-dimensional shape as a set of points;
a link information generation unit configured to generate link information that links the 3D spatial region with an atlas tile group; and
a file generation unit configured to generate a file that stores the bitstream generated by the encoding unit and the link information generated by the link information generation unit.

(20) An image processing method including:
encoding 2D data to generate a bitstream, the 2D data corresponding to a 3D spatial region of a point cloud expressing an object having a three-dimensional shape as a set of points;
generating link information that links the 3D spatial region with an atlas tile group; and
generating a file that stores the bitstream and the link information that have been generated.

REFERENCE SIGNS LIST

300 Encoding device
301 3D3D conversion unit
302 2D encoding unit
303 Metadata generation unit
304 PC stream generation unit
305 File generation unit
311 to 314 Encoding unit
400 Decoding device
401 File processing unit
402 2D decoding unit
403 Display information generation unit
411 Analysis unit
412 Extraction unit
421 to 424 Decoding unit
431 2D3D conversion unit
432 Display processing unit

The invention claimed is:
1. An image processing apparatus comprising:
circuitry configured to
select a 3D spatial region and an atlas tile group that correspond to a desired three-dimensional space, on a basis of link information that is stored in a file together with a bitstream of a point cloud expressing an object having a three-dimensional shape as a set of points, the link information linking the 3D spatial region of the point cloud with the atlas tile group;
extract, from the file, an atlas network abstraction layer (NAL) unit corresponding to the atlas tile group previously selected and extract a bitstream corresponding to the 3D spatial region previously selected; and
decode the bitstream extracted by the circuitry to generate 2D data corresponding to the 3D spatial region of the desired three-dimensional space, and decode the atlas NAL unit previously extracted to generate atlas information corresponding to the 2D data.

2. The image processing apparatus according to claim 1, wherein
the link information includes information that links the atlas tile group with a spatial region track group that is a group of tracks to store bitstreams corresponding to the 3D spatial region that is mutually same, in a multi-track structure.

3. The image processing apparatus according to claim 2, wherein
information that links the spatial region track group with the atlas tile group includes information that links track group identification information with group identification information, the track group identification information identifying a track that stores the bitstream, the group identification information identifying the atlas tile group to which the atlas NAL unit belongs.

4. The image processing apparatus according to claim 3, wherein
the file is a file of an international organization for standardization base media file format (ISOBMFF), and
information that links the track group identification information with the group identification information links the track group identification information with the group identification information by using VPCCSpatialRegionsBox of the ISOBMFF.

5. The image processing apparatus according to claim 3, wherein
the file is a file of an international organization for standardization base media file format (ISOBMFF), and
the group identification information links the atlas NAL unit and the atlas tile group by using NALUMapEntry of the ISOBMFF.

6. The image processing apparatus according to claim 5, wherein
the group identification information links the atlas NAL unit and the atlas tile group for each sample by using SampleToGroupBox of the ISOBMFF.

7. The image processing apparatus according to claim 2, wherein
information that links the spatial region track group with the atlas tile group includes information that links track group identification information with atlas tile group identification information, the track group identification information identifying a track that stores the bitstream, the atlas tile group identification information identifying the atlas tile group.

8. The image processing apparatus according to claim 7, wherein
the file is a file of an international organization for standardization base media file format (ISOBMFF), and
information that links the track group identification information with the atlas tile group identification information links the track group identification information with the atlas tile group identification information by using VPCCSpatialRegionsBox of the ISOBMFF.

9. The image processing apparatus according to claim 7, wherein
the file is a file of an international organization for standardization base media file format (ISOBMFF), and
information that links the track group identification information with the atlas tile group identification information links the track group identification information with the atlas tile group identification information by using SpatialRegionGroupBox of the ISOBMFF.

10. The image processing apparatus according to claim 2, wherein
information that links the spatial region track group with the atlas tile group includes information that links the spatial region track group with the atlas tile group by using division information of the 3D spatial region.

11. The image processing apparatus according to claim 2, wherein
information that links the spatial region track group with the atlas tile group includes information that links the atlas tile group with the bitstream corresponding to a tile of high efficiency video coding (HEVC) at a same position as the atlas tile group.

12. The image processing apparatus according to claim 1, wherein
the link information includes information that links the 3D spatial region with the atlas tile group in a single track structure.

13. The image processing apparatus according to claim 12, wherein
information that links the 3D spatial region with the atlas tile group includes information that links the 3D spatial region with group identification information that identifies the atlas tile group to which the atlas NAL unit belongs.

14. The image processing apparatus according to claim 12, wherein
information that links the 3D spatial region with the atlas tile group includes information that links track group identification information with atlas tile group identification information, the track group identification information identifying a track that stores a bitstream corresponding to the 3D spatial region, the atlas tile group identification information identifying the atlas tile group.

15. The image processing apparatus according to claim 1, wherein
the link information includes switching information that is information regarding switching of the 3D spatial region.

16. The image processing apparatus according to claim 15, wherein
the switching information includes information regarding a condition of the switching.

17. The image processing apparatus according to claim 15, wherein
the switching information includes information regarding an event that triggers the switching.

18. An image processing method comprising:
selecting a 3D spatial region and an atlas tile group that correspond to a desired three-dimensional space, on a basis of link information that is stored in a file together with a bitstream of a point cloud expressing an object having a three-dimensional shape as a set of points, the link information linking the 3D spatial region of the point cloud with the atlas tile group;
extracting, from the file, an atlas network abstraction layer (NAL) corresponding to the selected atlas tile group, and extracting a bitstream corresponding to the selected 3D spatial region; and
decoding the extracted bitstream to generate 2D data corresponding to the 3D spatial region of the desired three-dimensional space, and decoding the extracted atlas NAL unit to generate atlas information corresponding to the 2D data.

19. An image processing apparatus comprising:
circuitry configured to
encode 2D data to generate a bitstream, the 2D data corresponding to a 3D spatial region of a point cloud expressing an object having a three-dimensional shape as a set of points, and encode atlas information corresponding to the 2D data to generate an atlas network abstraction layer (NAL) unit corresponding to an atlas tile group;
generate link information that links the 3D spatial region with the atlas tile group; and
generate a file that stores the bitstream generated by the circuitry and the link information generated by the circuitry, wherein the file stores the atlas NAL unit.

20. An image processing method comprising:
encoding 2D data to generate a bitstream, the 2D data corresponding to a 3D spatial region of a point cloud expressing an object having a three-dimensional shape as a set of points, and encoding atlas information corresponding to the 2D data to generate an atlas network abstraction layer (NAL) unit corresponding to an atlas tile group;
generating link information that links the 3D spatial region with the atlas tile group; and
generating a file that stores the bitstream and the link information that have been generated, wherein the file stores the atlas NAL unit.

* * * * *